United States Patent
Kimber et al.

(10) Patent No.: US 10,250,813 B2
(45) Date of Patent: Apr. 2, 2019

(54) METHODS AND SYSTEMS FOR SHARING VIEWS

(71) Applicant: FUJI XEROX CO., LTD., Tokyo (JP)

(72) Inventors: Donald Kimber, Foster City, CA (US);
Sven Kratz, San Jose, CA (US);
Patrick F. Proppe, Palo Alto, CA (US);
Maribeth Joy Back, Los Gatos, CA (US);
Bee Y. Liew, Cupertino, CA (US);
Anthony Dunnigan, Palo Alto, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 127 days.

(21) Appl. No.: 14/476,605

(22) Filed: Sep. 3, 2014

(65) Prior Publication Data

US 2016/0065858 A1 Mar. 3, 2016

(51) Int. Cl.
| | | |
|---|---|---|
| *H04N 5/232* | (2006.01) | |
| *H04N 7/18* | (2006.01) | |
| *G06Q 10/10* | (2012.01) | |

(52) U.S. Cl.
CPC ........ *H04N 5/23296* (2013.01); *G06Q 10/101* (2013.01); *H04N 5/23203* (2013.01); *H04N 5/23293* (2013.01); *H04N 7/183* (2013.01)

(58) Field of Classification Search
CPC ........... H04N 5/23296; H04N 5/23293; G06Q 10/101; G06T 7/004
USPC .................................................. 348/333.05
See application file for complete search history.

(56) References Cited

U.S. PATENT DOCUMENTS

| | | | | |
|---|---|---|---|---|
| 7,116,357 | B1* | 10/2006 | Oya .................... | G08B 13/1968 348/211.8 |
| 7,626,569 | B2* | 12/2009 | Lanier .................. | G06F 1/1601 345/156 |
| 7,683,937 | B1* | 3/2010 | Blumenfeld ....... | H04N 5/23203 348/211.11 |
| 8,970,653 | B2* | 3/2015 | Bowen ..................... | H04N 7/15 348/14.03 |
| 2001/0024233 | A1* | 9/2001 | Urisaka .................. | H04N 5/232 348/211.6 |
| 2002/0067412 | A1* | 6/2002 | Kawai .................... | H04N 5/232 348/211.99 |
| 2006/0197839 | A1* | 9/2006 | Senior .................... | H04N 5/232 348/169 |
| 2010/0141767 | A1* | 6/2010 | Mohanty ................ | H04N 7/181 348/159 |

(Continued)

OTHER PUBLICATIONS

Chittaro et al., "3D Location-pointing as a Navigation Aid in Virtual Environments," http://web3d.dimi.uniud.it/publications/2004-10/ Jan. 7, 2003, 8 pgs.

(Continued)

*Primary Examiner* — Lin Ye
*Assistant Examiner* — Chan T Nguyen
(74) *Attorney, Agent, or Firm* — Morgan, Lewis & Bockius LLP

(57) ABSTRACT

A method at a first device with a display includes: receiving image information from a camera device, the image information corresponding to a first field of view associated with the camera device; receiving sensory information from a second device, the sensory information corresponding to a second field of view associated with the second device; and displaying on the display the image information and a visualization of at least one of the first field of view and the second field of view.

18 Claims, 15 Drawing Sheets

(56) References Cited

U.S. PATENT DOCUMENTS

| | | | |
|---|---|---|---|
| 2010/0277588 A1* | 11/2010 | Ellsworth | G06F 17/3087 348/144 |
| 2010/0280747 A1* | 11/2010 | Achthoven | G01C 21/3638 701/532 |
| 2011/0181718 A1* | 7/2011 | Seo | G01C 21/3647 348/143 |
| 2011/0199495 A1* | 8/2011 | Laberge | H04N 5/232 348/211.8 |
| 2011/0222757 A1* | 9/2011 | Yeatman, Jr. | G06T 7/0075 382/154 |
| 2012/0216129 A1* | 8/2012 | Ng | G06Q 10/00 715/753 |
| 2014/0340561 A1* | 11/2014 | Getman | H04N 5/23212 348/345 |
| 2015/0146004 A1* | 5/2015 | Kritt | G06K 9/00671 348/159 |
| 2015/0271393 A1* | 9/2015 | Cudak | G06F 17/3028 348/159 |
| 2015/0312529 A1* | 10/2015 | Bernal | G06K 9/00785 348/148 |

OTHER PUBLICATIONS

Burigat et al., "Visualizing Locations of Off-Screen Objects on Mobile Devices: A Comparative Evaluation of Three Approaches," http://frecce3d.uniud.it/publications/2006-08/ MobileHCI '06, Sep. 12-15, 2006, Helsinki, Finland, 8 pgs.

Baudisch et al., "Halo: a Technique for Visualizing Off-Screen Locations," http://citeseerx.ist.psu.edu/search?q=a+technique+for+visualizing+off-screen+locations&submit=Search&sort=rlv&t=doc Proc. CHI'03 , 2003, 2 pgs.

Gustafson et al., "Wedge: clutter-free visualization of off-screen locations" http://citeseerx.ist.psu.edu/search?q=a+technique+for+visualizing+off-screen+locations&submit=Search&sort=rlv&t=doc In CHI '08, 787-796 , 2008.

Schinke et al., Visualization of Off-Screen Objects in Mobile Augmented Reality; Proceedings of Mobile HCI Sep. 2010, 4 pgs.

* cited by examiner

METHODS AND SYSTEMS FOR SHARING VIEWS

TECHNICAL FIELD

The present application generally describes telepresence technologies and more particularly methods and systems for shared views.

BACKGROUND

Collaboration between people is a long-standing practice and time-honored practice in business and other endeavors. People working in teams and collaborating with each other can work more efficiently, and have greater potential for generating useful ideas for the work at hand. Advancements in technology have made collaboration even easier, including facilitating collaboration over long physical distances.

However, technologies employed to facilitate collaboration bring along their own set of challenges. One challenge presents itself in the scenario where a local user and a remote user are viewing an environment together, with the remote user relying on a camera local to the local user to view the environment. The local user may be looking at a particular part of the environment, and may even want to direct the remote user to that particular part, but the remote user cannot easily perceive where the local user is looking due to the limited field of vision of the camera. Further, constantly shifting the view between the environment and the local user, in order to see pick up any guidance from the local user, can become tedious. The reverse—the remote user looking at a particular part of the environment, and guiding the local user to look at that part—can also be difficult and tedious.

SUMMARY

In accordance with some embodiments, a method at a first device with a display includes: receiving image information from a camera device, the image information corresponding to a first field of view associated with the camera device; receiving sensory information from a second device, the sensory information corresponding to a second field of view associated with the second device; and displaying on the display the image information and a visualization of at least one of the first field of view and the second field of view.

In accordance with some embodiments, a first device, includes a display, memory, one or more processors, and one or more programs stored in the memory and configured for execution by the one or more processors. The one or more programs include instructions for: receiving image information from a camera device, the image information corresponding to a first field of view associated with the camera device; receiving sensory information from a second device, the sensory information corresponding to a second field of view associated with the second device; and displaying on the display the image information and a visualization of at least one of the first field of view and the second field of view.

In accordance with some embodiments, a non-transitory computer readable storage medium stores one or more programs to be executed by a computer system with a display, memory, and one or more processors. The one or more programs include instructions for receiving image information from a camera device, the image information corresponding to a first field of view associated with the camera device; instructions for receiving sensory information from a second device, the sensory information corresponding to a second field of view associated with the second device; and instructions for displaying on the display the image information and a visualization of at least one of the first field of view and the second field of view.

In accordance with some embodiments, a method at a first device includes: receiving image information from a camera device, the image information corresponding to a first field of view associated with the camera device; receiving sensory information from a second device, wherein the second device is remote from the first device and local to the camera device; receiving a user input; and in response to the user input, transmitting instructions to the camera device to reorient the first field of view based on the sensory information.

In accordance with some embodiments, a first device includes memory, one or more processors, and one or more programs stored in the memory and configured for execution by the one or more processors. The one or more programs include instructions for: receiving image information from a camera device, the image information corresponding to a first field of view associated with the camera device; receiving sensory information from a second device, wherein the second device is remote from the first device and local to the camera device; receiving a user input; and in response to the user input, transmitting instructions to the camera device to reorient the first field of view based on the sensory information.

In accordance with some embodiments, a non-transitory computer readable storage medium stores one or more programs to be executed by a computer system with memory, and one or more processors. The one or more programs include: instructions for receiving image information from a camera device, the image information corresponding to a first field of view associated with the camera device; instructions for receiving sensory information from a second device, wherein the second device is remote from the first device and local to the camera device; instructions for receiving a user input; and instructions for, in response to the user input, transmitting instructions to the camera device to reorient the first field of view based on the sensory information.

BRIEF DESCRIPTION OF THE DRAWINGS

Like reference numerals refer to corresponding parts throughout the drawings.

DESCRIPTION OF EMBODIMENTS

Reference will now be made in detail to various embodiments, examples of which are illustrated in the accompanying drawings. In the following detailed description, numerous specific details are set forth in order to provide a thorough understanding of the invention and the described embodiments. However, the invention may be practiced without these specific details. In other instances, well-known methods, procedures, components, and circuits have not been described in detail so as not to unnecessarily obscure aspects of the embodiments.

Figure 1:
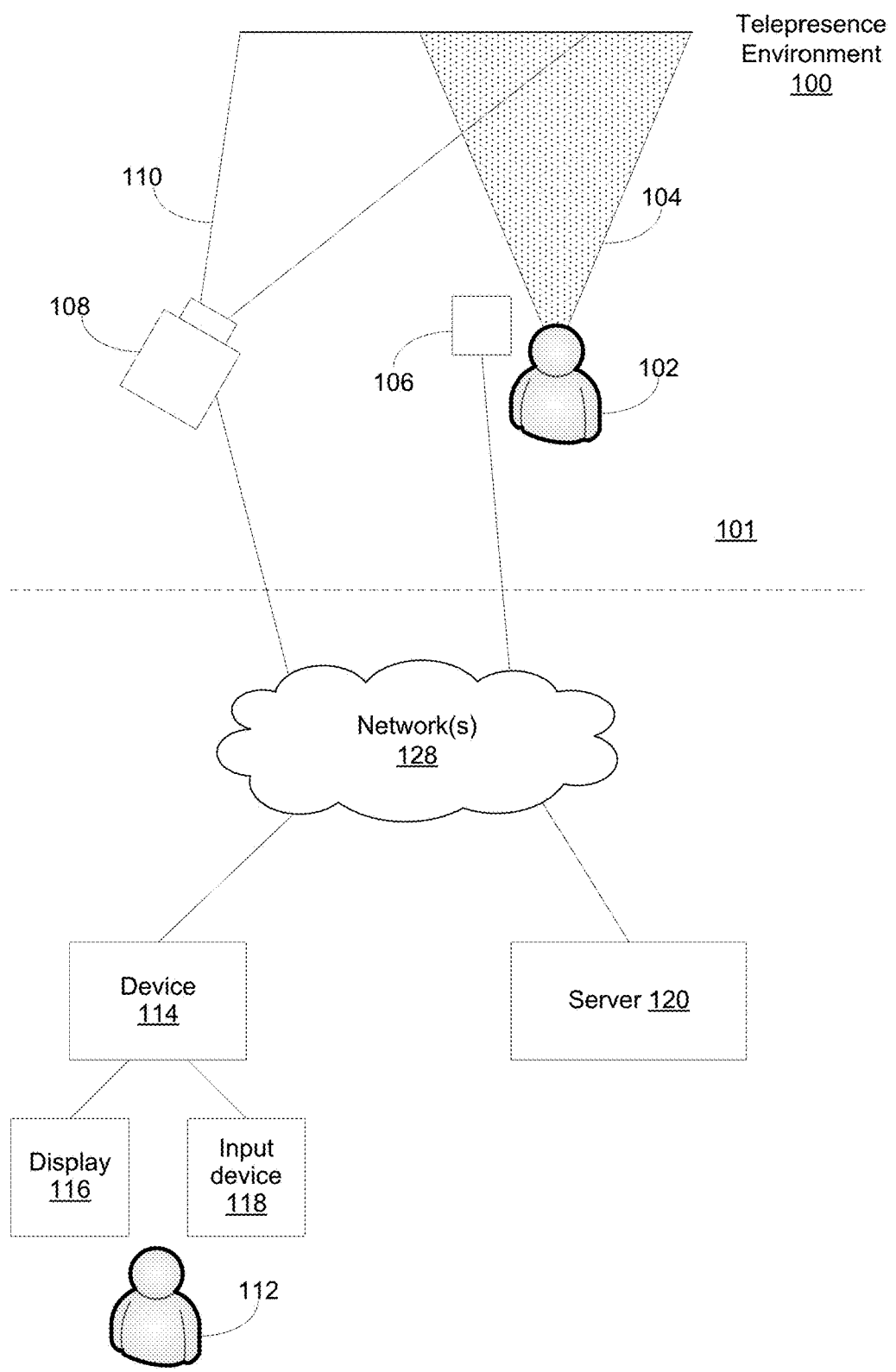
FIG. 1 is a block diagram illustrating a telepresence environment in accordance with some embodiments.

FIG. 1 illustrates a telepresence environment 100 in accordance with some embodiments. The telepresence environment 100 includes a sensory device 106, a camera device 108, a device 114 with a display 116 and an input device 118, a server or server system 120, and one or more communication networks 128. FIG. 1 shows two different telepresence regions separated by a dashed line. The region above the dashed line, which is referred to in some instances as "local," includes the devices used and/or controlled by one or more local users 102 to provide images and other information for viewing and consumption by and interaction with remote users. In some embodiments, the region below the dashed line, which is referred to in some instances as "remote," includes the devices used and/or controlled by one or more remote users 112 to view, consume or interact with the images and other information provided by the local users 102 and/or devices.

The communication network(s) 128 can be any wired or wireless local area network (LAN) and/or wide area network (WAN), such as an intranet, an extranet, or the Internet. It is sufficient that the communication network 104 provides communication capability between the server system 120 and the sensory device 106, the camera device 108, and the device 114.

In the telepresence environment 100, a user 102 (the "local user") in an environment 101 (the "local environment") is viewing the local environment 101 (e.g., viewing an object in the local environment 101, not shown). A user 112 who is located remotely from the local environment 101 (the "remote user") is viewing the local environment 101 through a camera device 108 local to the local user 102 and local environment 101. The local user 102 has a field of view 104 (e.g., the local user's eyes, a camera worn or carried by the local user), and the camera device 108 has a field of view 110. At any given instant, the fields of view of the local user 102 and the camera device 108 may or may not intersect and may or may not even be directed toward the same direction; the local user 102 and the camera device 108 may or may not be looking at the same object or even in the same direction. In some embodiments, the camera device 108 is configured to be manipulatable by the remote user 112. For example, the remote user 112 can adjust the pitch or yaw of the camera device 108 to reorient the camera field of view 110.

In some embodiments, the camera device 108 is any image capture device with connectivity to the networks 128 and, optionally, one or more additional sensors (e.g., Global Positioning System (GPS) receiver, accelerometer, gyroscope, magnetometer, etc.) that enable the position and/or orientation and field of view of the camera device 108 to be determined. For example, the camera device 108 may be a smartphone with a camera or a tablet device with a camera. In some embodiments, in addition to providing video of the local environment 101, the camera device 108 and/or the sensory device 106 includes a microphone and other sensors (e.g., thermometer, altimeter, barometer, etc.) to provide additional telepresence information to local users 102. As a result, the camera device 108 can provide audio and video and other environmental information for meetings, presentations, tours, and musical or theater performances, all of which can be experienced by the remote user 112 through the remote devices 114. Directional information for these sensors, if applicable, can be presented to the remote user 112 in much the same fashion as for video information as described herein.

In some embodiments, the camera device 108 is worn or carried by the local user 102. For example, the camera device 108 may be mounted on an arm or a boom extending from a harness worn by the local user 102. As another example, the camera device 108 may be mounted on headgear (e.g., a helmet, a hat) worn by the local user 102. In these embodiments, the absolute position of the camera device 102 changes as the local user 102 moves, but the position and distance of the camera device 108 relative to the local user 102 remains the same. Other methods of maintaining the same distance relative to the local user 102 is possible (e.g., mounted on a cart or other wheeled platform propelled by the local user 102).

In some other embodiments, the camera device 108 is placed or mounted on a stationary platform. For example, the camera device 108 may be placed on a table. In these embodiments, the absolute position of the camera device 108 remains unchanged, but the position and distance of the camera device 108 relative to the local user 102 changes as the local user 102 moves around.

In some embodiments, the camera device 108 includes (e.g., is mounted on) a platform or other system that allows for free 360-degree orientation of the camera device 108 (so that the camera device 108 can be pointed toward any direction), regardless of whether the camera device 108 maintains absolute position or maintains relative position with respect to the local user 102. For example, the camera device 108 may be mounted on a platform that allows for the free orientation; and that platform is mounted on an arm/boom or headgear, or placed on a table.

The camera device 108 outputs image data corresponding to its view of the local environment 101 to a device 114. The device 114 (the "remote device") is local with respect to the remote user 112 (and thus remote with respect to the local environment 101, local user 102, and camera device 108). In some embodiments, the remote device 114 is a client device (e.g., desktop or notebook computer, a smartphone, or a tablet device).

The remote device 114 includes (e.g., is coupled to) a display 116 and one or more input devices 118. The device 114 outputs images (e.g., video) corresponding to the image data from the camera device 108 to the display 116 for display to the remote user 112. The remote user 112 uses the input device 118 to input commands in order to manipulate the camera device 108. The device 114 receives these command inputs and sends corresponding control signals to the camera device 108.

In some embodiments, the local user 102 wears a sensory device 106. The sensory device 106 includes one or more sensors that, when calibrated to the local user's head position and direction of view), outputs data that can be used to determine the local user's field of view 104 (including direction and angular extent of view). The sensory device 106 includes connectivity to the networks 128. In some embodiments, the sensory device 106 optionally includes a camera device, output data from which can also be used to determine the local user's field of view. In some embodiments, the sensory device 106 optionally includes a display device that displays information to the local user 102.

In some embodiments, the sensory device 106 is wearable headgear with sensors, optionally a camera device, and optionally a head-up display or head-mounted display or some other display. Examples, without limitation, of sensory devices 106 include a helmet with a head-mounted display, sensors, and camera; and Google Glass by Google Inc.

The sensory device 106, camera device 108, and the remote device 114 exchange data through a server 120; the sensory device 106, camera device 108, remote device 114, and server 120 are connected through the networks 128. In some embodiments, the server system 120 includes a telepresence control module (further described below with reference to FIG. 5) for coordinating the data exchange and relay between the sensory device 106, camera device 108, and the remote device 114. Thus, the sensory device 106, camera device 108, and the remote device 114 connect to the server system 106 through the networks 128, and send data to and receive data from each other through the server system 106.

In some embodiments, the camera device 108 sends image data, optional sensor data, and optional metadata to the server system 120. The sensory device 106 sends sensor data, optional image data, and optional metadata to the server 120. The remote device 114 sends control signals (e.g., user commands to manipulate the camera 108) to the server 120. The server 120 receives the image data from the camera module 108 and the optional image data from the sensory device 106, and sends the camera device image data and optionally the sensory device image data to the remote device 114 for display. The server 120 receives the control signals from the remote device 114 and sends the control signals to the camera device 108 for manipulation of the camera device 108 in accordance with the user commands.

The server 120 receives the image data, sensor data, and metadata from the camera device 108 and the sensor data, image data, and metadata from the sensory device 106. In some embodiments, the server 120 processes these data to generate visualization data for displaying visualizations of fields of view and relative positions of the camera device 108 and the sensory device 106. The server 120 sends the visualization data to the remote device 114 and the sensory device 106 for display. In some other embodiments, the server 120 sends the data from the camera device 108 to the sensory device 106, and sends the data from the sensory device 106 to the camera device 108, and the camera device 108 and the sensory device 106 respectively processes the data from the other device, as well as their own respective data, to generate the visualizations.

Figure 2:
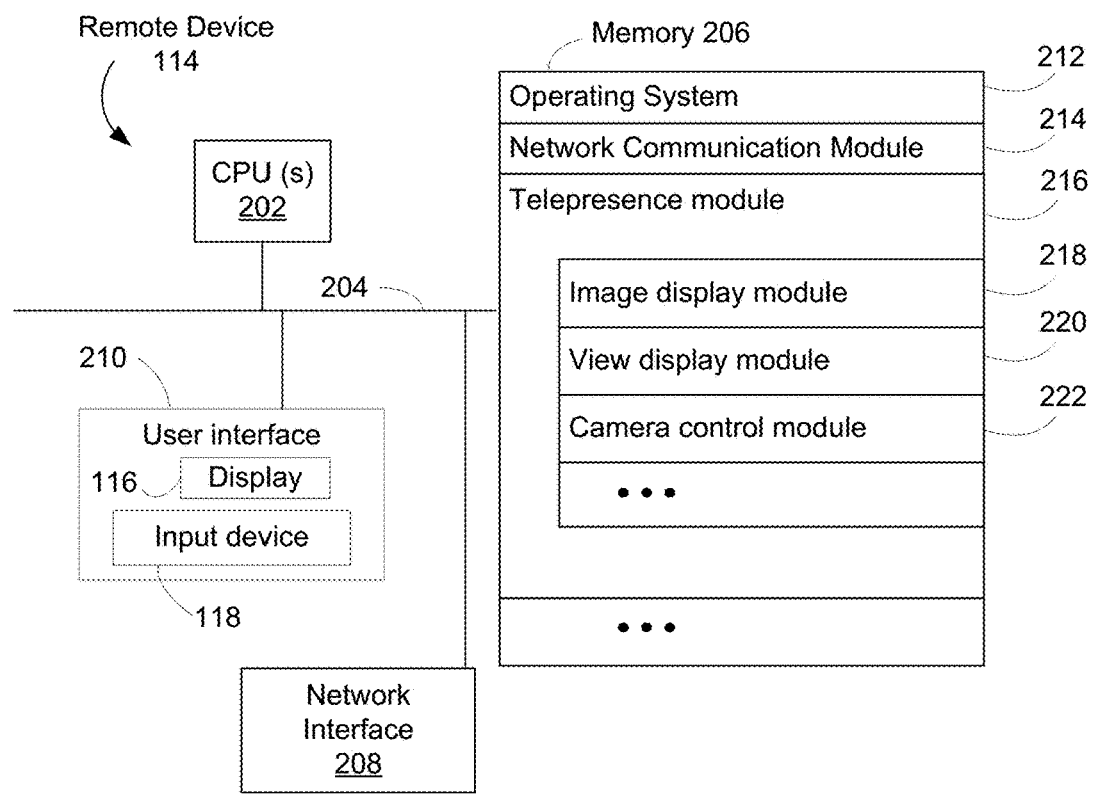
FIG. 2 is a block diagram illustrating a client device in accordance with some embodiments.

FIG. 2 is a block diagram illustrating a remote device 114, in accordance with some embodiments. The remote device 114 typically includes one or more processing units (CPU's) 202, one or more network or other communications interfaces 208, memory 206, and one or more communication buses 204, for interconnecting these components. The communication buses 204 optionally include circuitry (sometimes called a chipset) that interconnects and controls communications between system components. The remote device 114 may also include a user interface 210 comprising a display device 116 and one or more input devices 118. In some embodiments, the input device(s) 118 include one or more of: a keyboard, a mouse, a touch-sensitive surface (e.g., a track pad, a touch-sensitive display), a joystick, and a trackball. In some embodiments, the remote device 114 also includes an audio output device (e.g., a speaker, headphones) and/or an audio input device (e.g., a microphone) (not shown). Memory 206 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the CPU(s) 202. Memory 206, or alternatively the non-volatile memory device(s) within memory 206, comprises a non-transitory computer readable storage medium. In some embodiments, memory 206 or the computer readable storage medium of memory 206 store the following programs, modules and data structures, or a subset thereof, including operating system 212, network communication module 214, and a telepresence module 216.

The operating system 212 includes procedures for handling various basic system services and for performing hardware dependent tasks.

The network communication module 214 facilitates communication with other devices, computers, and systems via the one or more communication network interfaces 208 (wired or wireless) and one or more communication networks, such as the Internet, other wide area networks, local area networks, metropolitan area networks, and so on.

The telepresence module 216 (e.g., a telepresence application) processes and displays data received from other telepresence devices (e.g., camera device 108, sensory device 106, FIG. 1) and facilitates manipulation of the camera device 108 by the remote user 112. In some embodiments, the telepresence module includes an image display module 218, a view display module 220, and camera control module 222. The image display module 218 processes image data received from the camera device 108 and displays the image data (e.g., as video) on the display 116. The view display module 220 receives data (e.g., sensor data from the camera device 108 and the sensory device 106, or visualization data from the server 120 generated from data from the camera device 108 and the sensory device 106), processes the data, and displays the data as visualizations of fields of view and relative position on the display 116. The view display module 220 also displays a user interface for issuing commands to the camera device 108 (e.g., icons 850, 852, and 854, FIGS. 8A-8C), and optionally, interacting with the displayed visualizations. The camera control module 222 processes user inputs received on the input devices 118, and send commands, instructions, and/or control signals to the server system 120 in accordance with the user inputs. The control signals are sent to the camera device 108 to manipulate the camera device 108.

Each of the above identified elements may be stored in one or more of the previously mentioned memory devices, and each of the modules or programs corresponds to a set of instructions for performing a function described above. The set of instructions can be executed by one or more processors (e.g., the CPUs 202). The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above.

Although FIG. 2 shows a remote device, FIG. 2 is intended more as functional description of the various features which may be present in a remote device than as a structural schematic of the embodiments described herein. In practice, and as recognized by those of ordinary skill in the art, items shown separately could be combined and some items could be separated.

Figure 3:
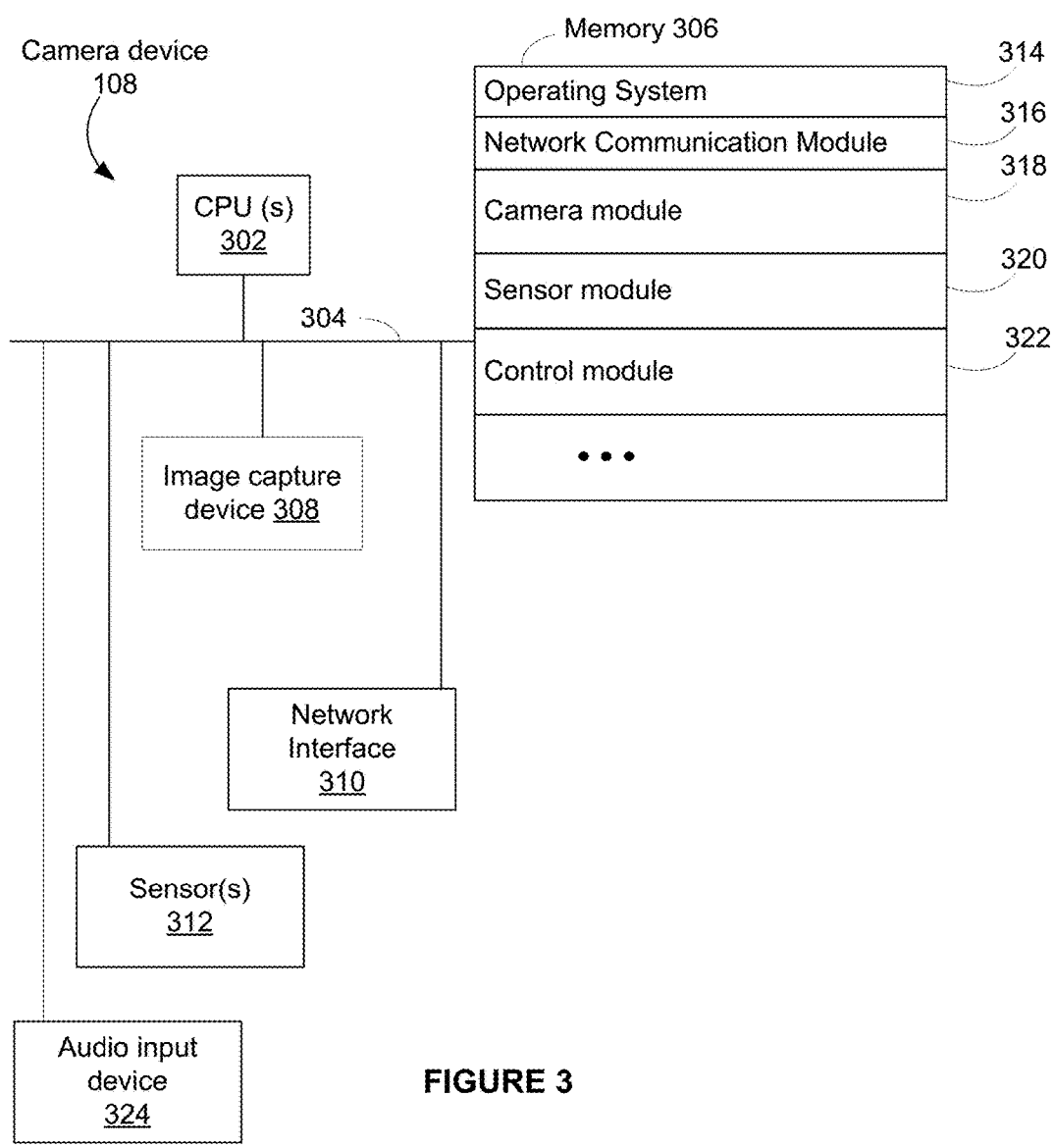
FIG. 3 is a block diagram illustrating a camera device in accordance with some embodiments.

FIG. 3 is a block diagram illustrating a camera device 108, in accordance with some embodiments. The camera device 108 typically includes one or more processing units (CPU's) 302, one or more network or other communications interfaces 310, memory 306, a image capture device 308, optionally one or more sensors 312, and one or more communication buses 304, for interconnecting these components. The communication buses 304 optionally include circuitry (sometimes called a chipset) that interconnects and controls communications between system components. In some embodiments, the sensors 312 include one or more of: an accelerometer, a gyroscope, and a magnetometer. In some embodiments, the camera device 108 also includes an audio output device (e.g., a speaker, headphones) (not shown) and/or an audio input device 324 (e.g., a microphone). Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302. Memory 306, or alternatively the non-volatile memory device(s) within memory 306, comprises a non-transitory computer readable storage medium. In some embodiments, memory 306 or the computer readable storage medium of memory 306 store the following programs, modules and data structures, or a subset thereof, including operating system 314, network communication module 316, camera module 318, sensor module 320, and control module 322.

The operating system 314 includes procedures for handling various basic system services and for performing hardware dependent tasks.

The network communication module 316 facilitates communication with other devices, computers, and systems via the one or more communication network interfaces 310 (wired or wireless) and one or more communication networks, such as the Internet, other wide area networks, local area networks, metropolitan area networks, and so on.

The camera module 318 captures images (e.g., video) using the image capture device 308, encodes the captured images into image data, and transmits the image data to the server system 120 enroute to the remote device 114 for display at the remote device 114.

The sensor module 320 obtains readings from sensors 312, processes the readings into sensor data, and transmits the sensor data to the server system 120.

The control module 322 receives control signals from the remote device 114 (through the server system 120) and performs operations (e.g., moves or reorients the camera device 108) in accordance with the control signals.

In some embodiments, the camera device 108 includes a location device (e.g., a GPS receiver) for determining a geographical location of the camera device 108.

Each of the above identified elements may be stored in one or more of the previously mentioned memory devices, and each of the modules or programs corresponds to a set of instructions for performing a function described above. The set of instructions can be executed by one or more processors (e.g., the CPUs 302). The above identified modules or programs (i.e., sets of instructions) need not be implemented as separate software programs, procedures or modules, and thus various subsets of these modules may be combined or otherwise re-arranged in various embodiments. In some embodiments, memory 306 may store a subset of the modules and data structures identified above. Furthermore, memory 306 may store additional modules and data structures not described above.

Although FIG. 3 shows a camera device, FIG. 3 is intended more as functional description of the various features which may be present in a camera device than as a structural schematic of the embodiments described herein. In practice, and as recognized by those of ordinary skill in the art, items shown separately could be combined and some items could be separated.

Figure 4:
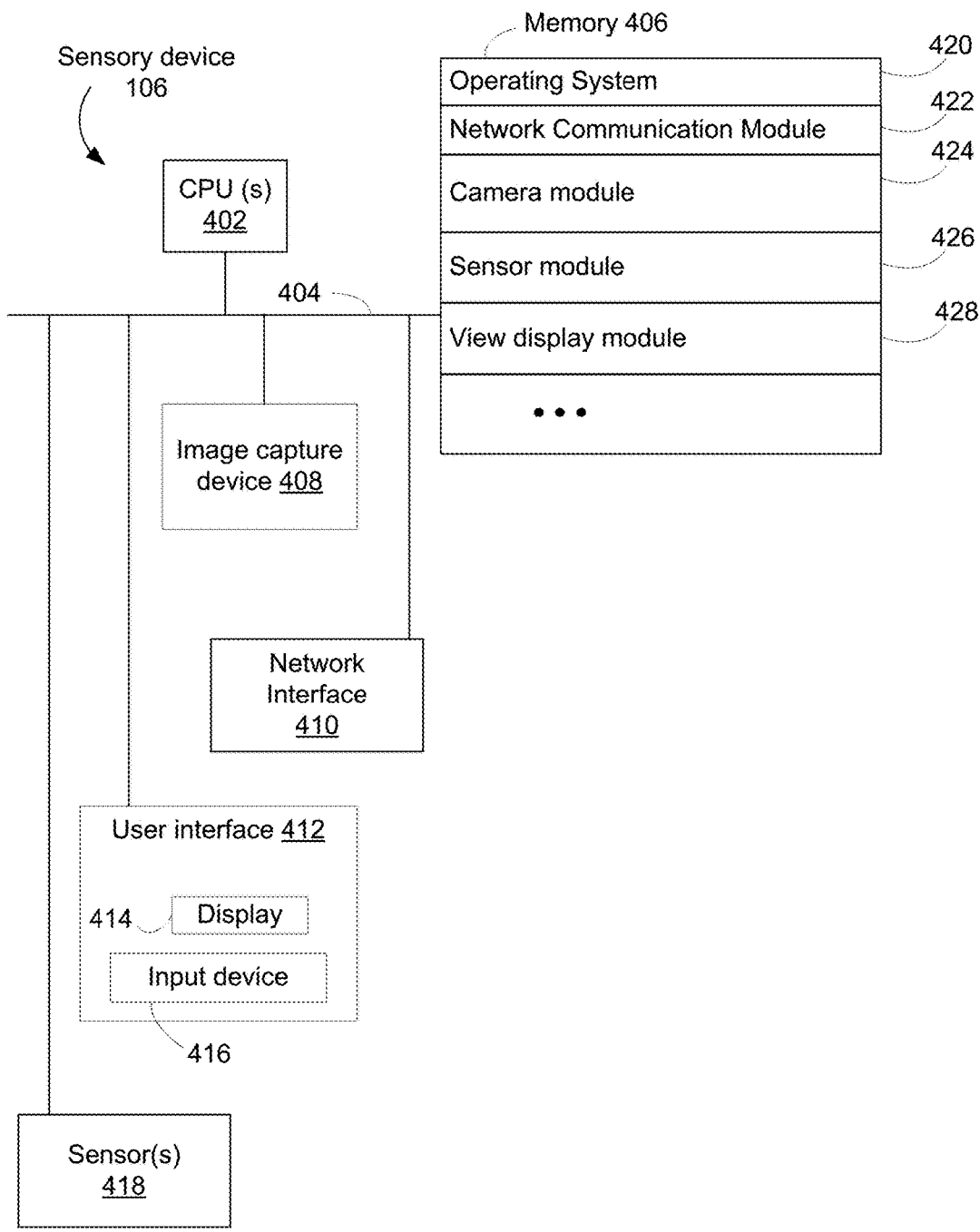
FIG. 4 is a block diagram illustrating a sensory device in accordance with some embodiments.

FIG. 4 is a block diagram illustrating a sensory device 106, in accordance with some embodiments. The sensory device 106 typically includes one or more processing units (CPU's) 402, one or more network or other communications interfaces 410, memory 406, optionally an image capture device 408, one or more sensors 418, optionally a user interface 412, and one or more communication buses 404, for interconnecting these components. The communication buses 404 optionally include circuitry (sometimes called a chipset) that interconnects and controls communications between system components. In some embodiments, the sensors 418 include one or more of: an accelerometer, a gyroscope, and a magnetometer. The user interface 412 includes a display device 414 and one or more input devices 416 (e.g., one or more buttons, a touch-sensitive surface). In some embodiments, the sensory device 106 also includes an audio output device (e.g., a speaker, headphones) and/or an audio input device (e.g., a microphone) (not shown). Memory 406 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 406 may optionally include one or more storage devices remotely located from the CPU(s) 402. Memory 406, or alternatively the non-volatile memory device(s) within memory 406, comprises a non-transitory computer readable storage medium. In some embodiments, memory 406 or the computer readable storage medium of memory 406 store the following programs, modules and data structures, or a subset thereof, including operating system 420, network communication module 422, camera module 424, sensor module 426, and view display module 428.

The operating system 420 includes procedures for handling various basic system services and for performing hardware dependent tasks.

The network communication module 422 facilitates communication with other devices, computers, and systems via the one or more communication network interfaces 410 (wired or wireless) and one or more communication networks, such as the Internet, other wide area networks, local area networks, metropolitan area networks, and so on.

The camera module 424 captures images (e.g., video) using the image capture device 408, encodes the captured images into image data, and transmits the image data to the server system 120.

The sensor module 426 obtains readings from sensors 418, processes the readings into sensor data, and transmits the sensor data to the server system 120.

The view display module 428 receives visualization data from the server system 120 and displays the visualization data on the display 414. For example, in some embodiments, the view display module 428 controls a display of the sensory device 106 to display for the local user 102 one or more visualizations showing relative views of the local user 102, the camera device 108 and the remote user 112.

In some embodiments, the sensory device 106 includes a location device (e.g., a GPS receiver) for determining a geographical location of the sensory device 106.

Each of the above identified elements may be stored in one or more of the previously mentioned memory devices, and each of the modules or programs corresponds to a set of instructions for performing a function described above. The set of instructions can be executed by one or more processors (e.g., the CPUs 402). The above identified modules or programs (i.e., sets of instructions) need not be implemented as separate software programs, procedures or modules, and thus various subsets of these modules may be combined or otherwise re-arranged in various embodiments. In some embodiments, memory 406 may store a subset of the modules and data structures identified above. Furthermore, memory 406 may store additional modules and data structures not described above.

Although FIG. 4 shows a sensory device, FIG. 4 is intended more as functional description of the various features which may be present in a sensory device than as a structural schematic of the embodiments described herein. In practice, and as recognized by those of ordinary skill in the art, items shown separately could be combined and some items could be separated.

Figure 5:
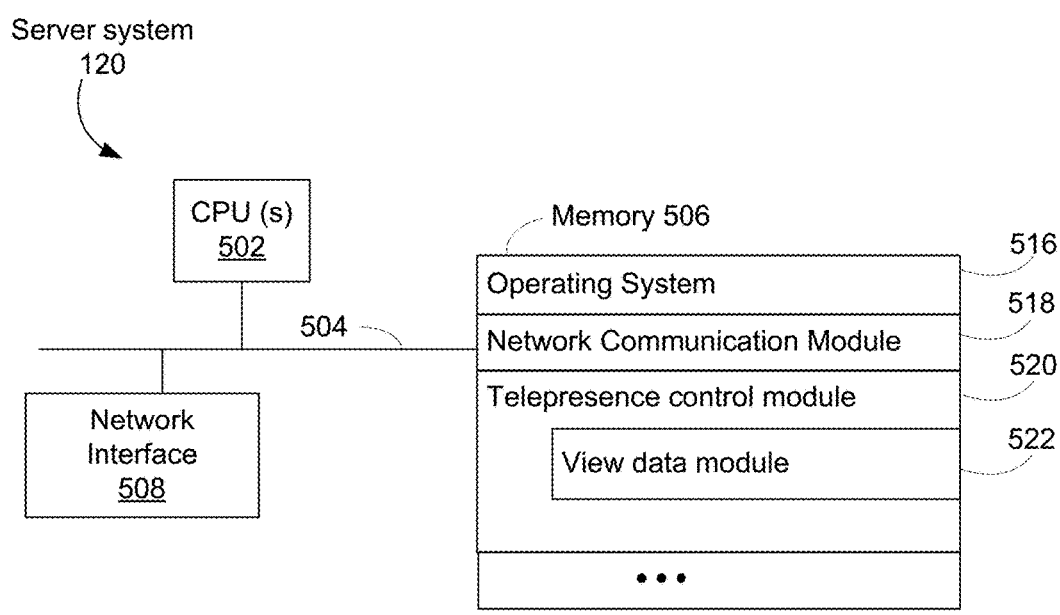
FIG. 5 is a block diagram illustrating a server system in accordance with some embodiments.

FIG. 5 is a block diagram illustrating a server system 120, in accordance with some embodiments. The server system 120 typically includes one or more processing units (CPU's) 502, one or more network or other communications interfaces 508, memory 506, and one or more communication buses 504 for interconnecting these components. The communication buses 504 optionally include circuitry (sometimes called a chipset) that interconnects and controls communications between system components. Memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 506 may optionally include one or more storage devices remotely located from the CPU(s) 502. Memory 506, including the non-volatile and volatile memory device(s) within memory 506, comprises a non-transitory computer readable storage medium. In some embodiments, memory 506 or the non-transitory computer readable storage medium of memory 506 stores the following programs, modules and data structures, or a subset thereof including an operating system 516, a network communication module 518, and a telepresence control module 520.

The operating system 516 includes procedures for handling various basic system services and for performing hardware dependent tasks.

The network communication module 518 facilitates communication with other devices, computers, and systems via the one or more communication network interfaces 508 (wired or wireless) and one or more communication networks, such as the Internet, other wide area networks, local area networks, metropolitan area networks, and so on.

The telepresence control module 520 manages the exchange of data and signals amongst the camera device 108, the sensory device 106, and the remote device 114. The telepresence control module 520 receives data from the camera device 108 and sensory device 106, and control signals from the remote device 114, and sends the data and signals to their respective destinations (e.g., image data from the camera device 108 to the remote device 114, control signals from the remote device 114 to the camera device 108). The telepresence control module 520 directs the data to their respective destinations for display and/or processing.

In some embodiments, the telepresence control module 520 includes a view data module 522. The view data module 522 processes the data received from the camera device 108 and the sensor device 106 to generate visualization data, which is sent to the remote device 114 and the sensory device 106 for display.

Each of the above identified elements may be stored in one or more of the previously mentioned memory devices, and each of the modules or programs corresponds to a set of instructions for performing a function described above. The set of instructions can be executed by one or more processors (e.g., the CPUs 502). The above identified modules or programs need not be implemented as separate software programs, procedures or modules, and thus various subsets of these modules may be combined or otherwise re-arranged in various embodiments. In some embodiments, memory 506 may store a subset of the modules and data structures identified above. Furthermore, memory 506 may store additional modules and data structures not described above.

Although FIG. 5 shows a server system, FIG. 5 is intended more as functional description of the various features which may be present in a set of servers than as a structural schematic of the embodiments described herein. In practice, and as recognized by those of ordinary skill in the art, items shown separately could be combined and some items could be separated. For example, some items (e.g., operating system 516 and network communication module 518) shown separately in FIG. 5 could be implemented on single servers and single items could be implemented by one or more servers. The actual number of servers used to implement the server system 120 and how features are allocated among them will vary from one embodiment to another, and may depend in part on the amount of data traffic that the system must handle during peak usage periods as well as during average usage periods.

In some embodiments, modules at the remote device 114, camera device 108, sensory device 106, and the server system 120 support a command interface for exchanging communications and instructions between the remote device 114, camera device 108, and sensory device 106. For example, the camera control module 222 facilitates manipulation of the camera device 108 by the remote user 112, and the display modules 218 and 220 display images and visualizations derived from data from the camera device 108 and the sensory device 106. The control module 322 at the camera device 108 receives the commands/instructions/control signals originating from the remote device 114 and performs operations in accordance with the commands/instructions/control signals (e.g., rotating the camera device 108, etc.). The remote user 112 and the local user 102 may communicate with each other using voice and/or visual signals sent between the remote device 114 and the sensory device 106. The server system 120, with its telepresence control module, coordinates these features and operations amongst the camera device 108, the sensory device 106, and the remote device 114 within the telepresence environment 100.

Figure 6:
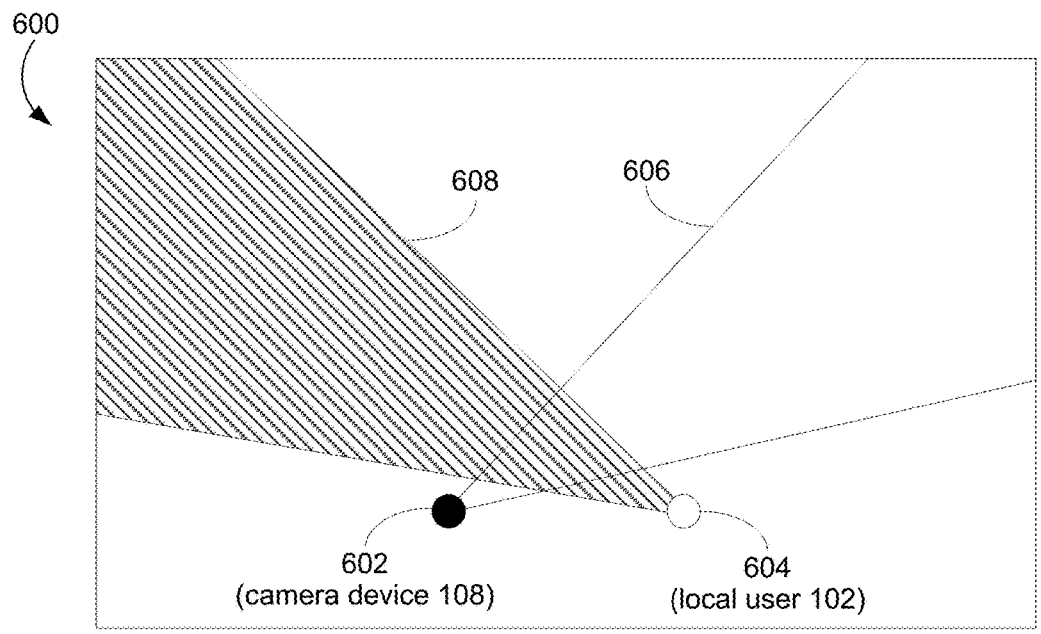
FIG. 6 illustrates an example visualization of views in accordance with some embodiments.

FIG. 6 illustrates an example visualization of views in accordance with some embodiments. FIG. 6 illustrates a visualization 600 that shows a bird's eye perspective of the relative positions of the camera device 108 and local user 102 (with respect to each other), and their respective fields of view 110 and 104. In some embodiments, the sensory device 106, and its relative position and field of view, serves as a proxy for the local user 102, and thus what is shown in the visualization 600 are the relative positions of the camera device 108 and the sensory device 106, and their respective fields of view. For convenience of description, unless described otherwise, the field of view 104 of the local user is also the field of view of the sensory device 106. In some embodiments, the visualization 600 is displayed on the display 116 of the remote device 114. For example, at the remote device 114, the visualization 600 is displayed along with video from the camera device 108. In some embodiments, the visualization 600 (or a similar visualization) is displayed on the display 414 of the sensory device 106, as well as at the remote device 114.

In the visualization 600, a marker 602 indicates the relative position of the camera device 108, and a marker 604 indicates the relative position of the local user 102 (or its proxy the sensory device 106). In some embodiments, the relative positions of the camera device 108 and the local user 102/sensory device 106 are known because the camera device 108 is placed or mounted at a fixed distance relative to the local user 102/sensory device 106 (e.g., mounted on an arm extending from a harness worn by the local user 102). The fixed distance may be provided as an initial input and/or a calibration input to the server system 120, the remote device 114, the camera device 108, and/or the sensory device 106.

In some embodiments, the relative positions of the camera device 108 and the local user 102/sensory device 106 are determined based on the sensor data at the respective devices. In some embodiments, the camera device 108 and the sensory device 106 both include location devices (e.g., GPS receiver, or indoor positioning such as ultrasonic systems), and their relative positions are determined based on their geographic positions determined using the location devices. In some embodiments, the local environment 101 includes one or more tracking cameras (e.g., a meeting room equipped with tracking cameras), and the positions of the local user 102 and the camera device 108 are determined by computer vision tracking methods using these tracking cameras.

In the visualization 600, an area 606 indicates the field of view 110 of the camera device 108, and an area 608 indicates the field of view 104 of the local user 102/sensory device 106. In some embodiments, the areas 606 and/or 608 are predefined based on known capabilities of the devices. For example, the size of the field of view 110 of the camera device 108 may be known, and may be provided as an initial input and/or a calibration input. In some embodiments, the area 606 is determined based on the image data and optionally the sensor data of the camera device 108, and the area 608 is determined based on the sensor data and optionally the image data of the sensory device 106. In some embodiments, the directions of the fields of view 110 and 104 of the camera device 108 and the local user 102 are determined using the sensor systems on the camera device 108 and the sensory device 106, respectively (e.g., sensors 312, sensors 418), such as an inertial measurement unit (IMU) using magnetometers and gyroscopes. In some embodiments, for a camera device 108 with a variable field of view (e.g., a camera with zoom), the field of view 110 of the camera device 108 is determined though image metadata or an application programming interface (API) of the camera device 108.

As the local user 102 and/or the camera device 108 moves, the markers 602 and 604 remain stationary in the visualization if the camera device 108 has a fixed distance with respect to the local user 102 (e.g., local user 102 wears a harness with camera device 108 mounted on an arm extending from the harness). Either marker 602 or 604 moves if the camera device 108 does not have a fixed distance with respect to the local user 102 (e.g., camera device 108 is on a table and the local user 102 is mobile). This visualization is very helpful in communicating to both a remote user how a local user is oriented with respect to the local environment and therefore provides a frame of reference by which the local user can communicate about a point of interest to the remote user, and by which the remote user can direct the local user's attention to a particular object that is represented on the display 116 at the remote device 114.

Figure 7:
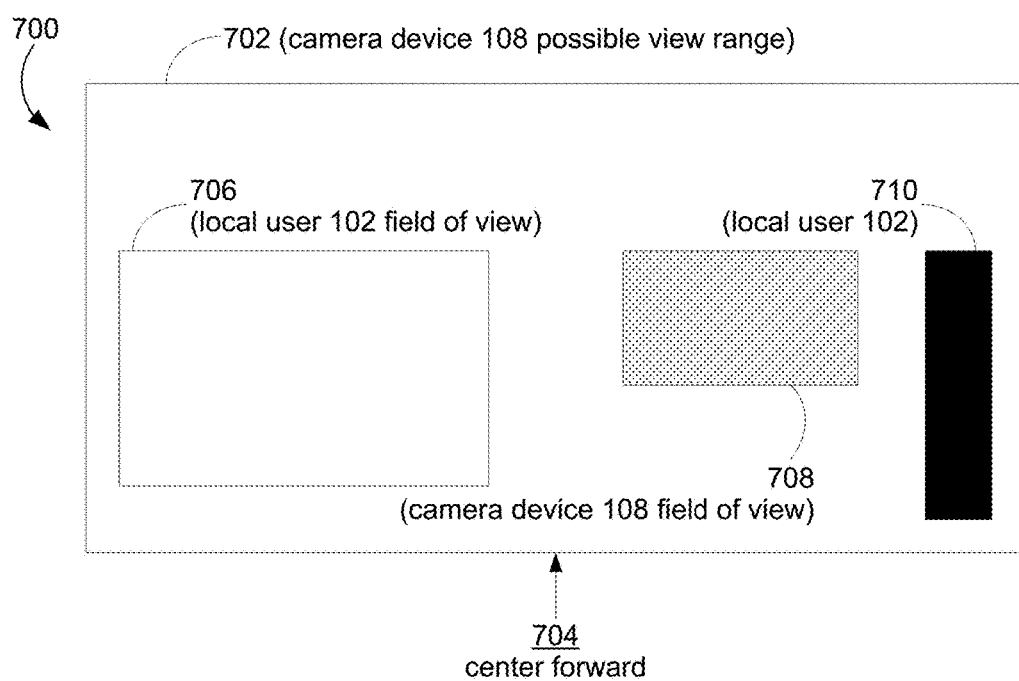
FIG. 7 illustrates another example visualization of views in accordance with some embodiments.

FIG. 7 illustrates another example visualization of views in accordance with some embodiments. FIG. 7 illustrates a visualization 700 that shows a first person perspective, from the perspective of the camera device 108, of the relative position of the local user 102/sensory device 106 with respect to the camera device 108 and the respective fields of view 110 and 104 of the camera device 108 and the local user 102/sensory device 106. In some embodiments, the visualization 700 is displayed on the display 116 of the remote device 114. For example, at the remote device 114, the visualization 700 is displayed along with video from the camera device 108. In some embodiments, the visualization 700 (or a similar visualization) is displayed on the display 414 of the sensory device 106, as well as at the remote device 114.

The visualization 700 includes an area 702 that represents the possible range of view of the camera device 108. The middle of the area 702 represents the center forward direction 704 for the camera device 108. One or more areas are displayed within the range of view area 702. For example, an area 706 represents the field of view 104 of the local user 102/sensory device 106. An area 708 represents the actual field of view 110 of the camera device 108. An area 710 represents the location of the local user 102 relative to the camera device 108.

Thus, the remote user 112, viewing the image data from the camera device 108 and visualization 600 or 700, can manipulate the camera device 108 to reorient the camera device 108 so that the field of the view 110 of the camera device 108 points in the same direction as the field of view 104 of the local user 102 or to bring the local user 102 within the field of view 110 of the camera device 108, an example of which is described below.

Figure 8A:
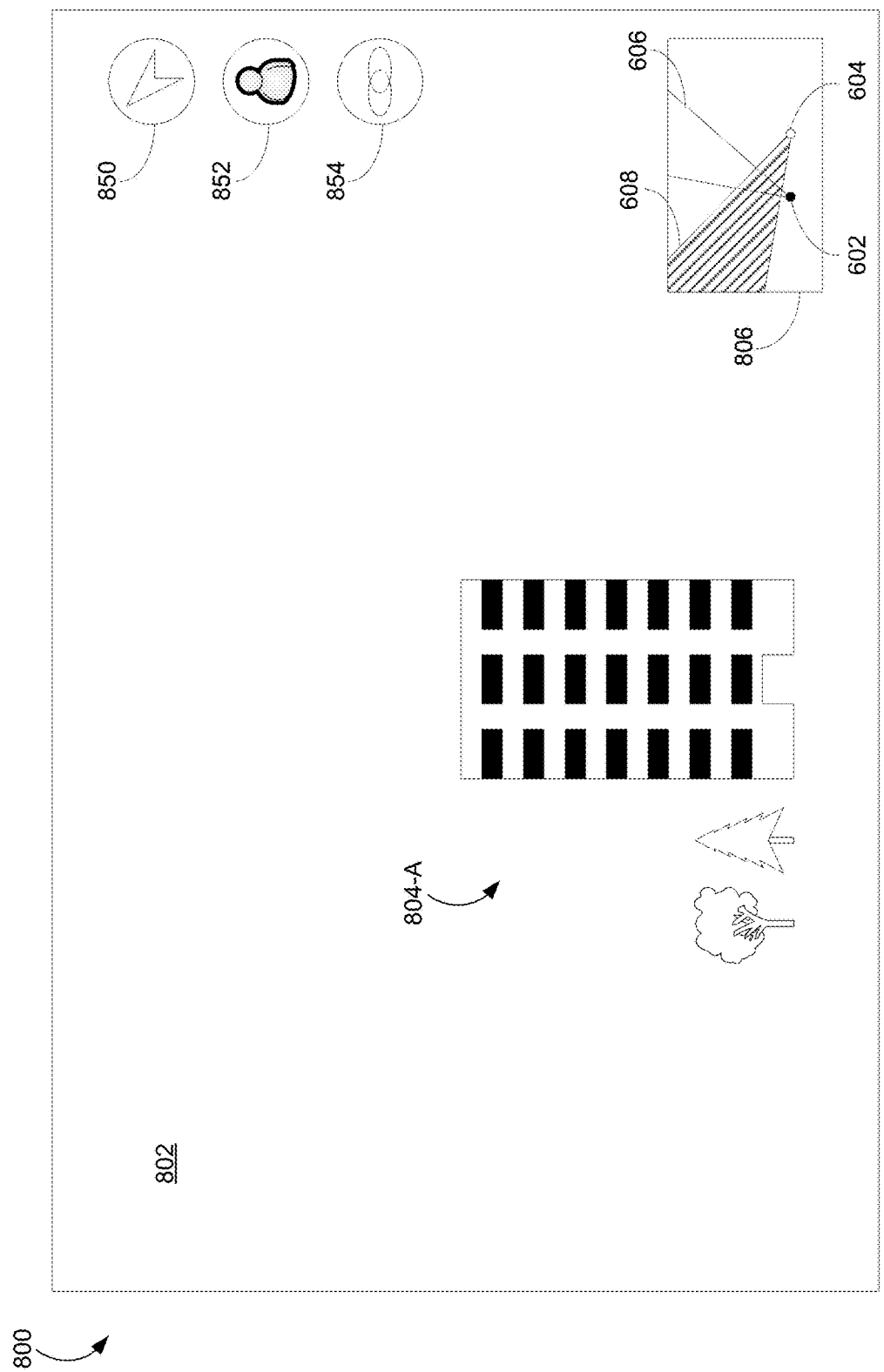
FIGS. 8A-8C illustrate examples of view information and camera device orientation in accordance with some embodiments.
Figure 8B:
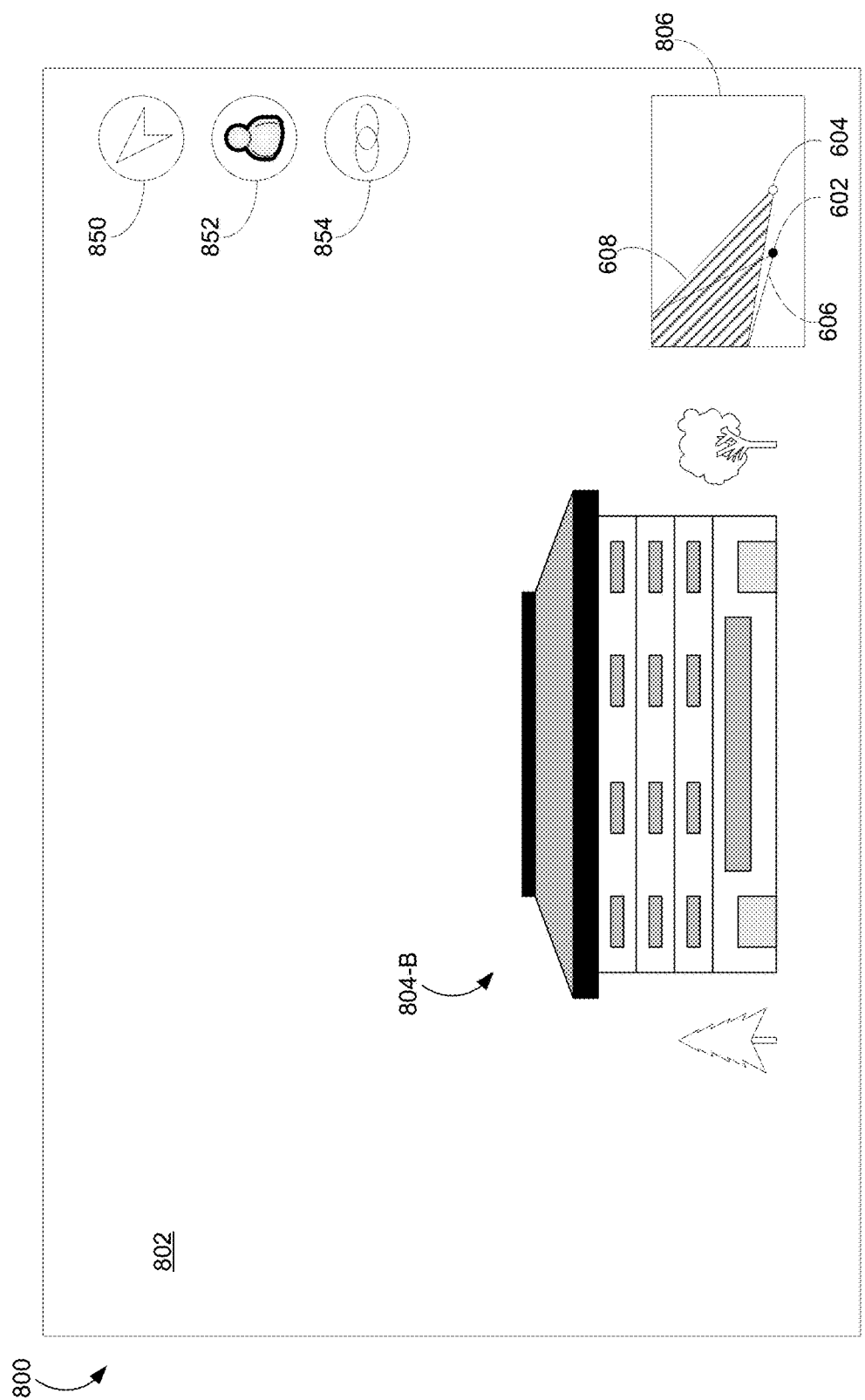
Figure 8C:
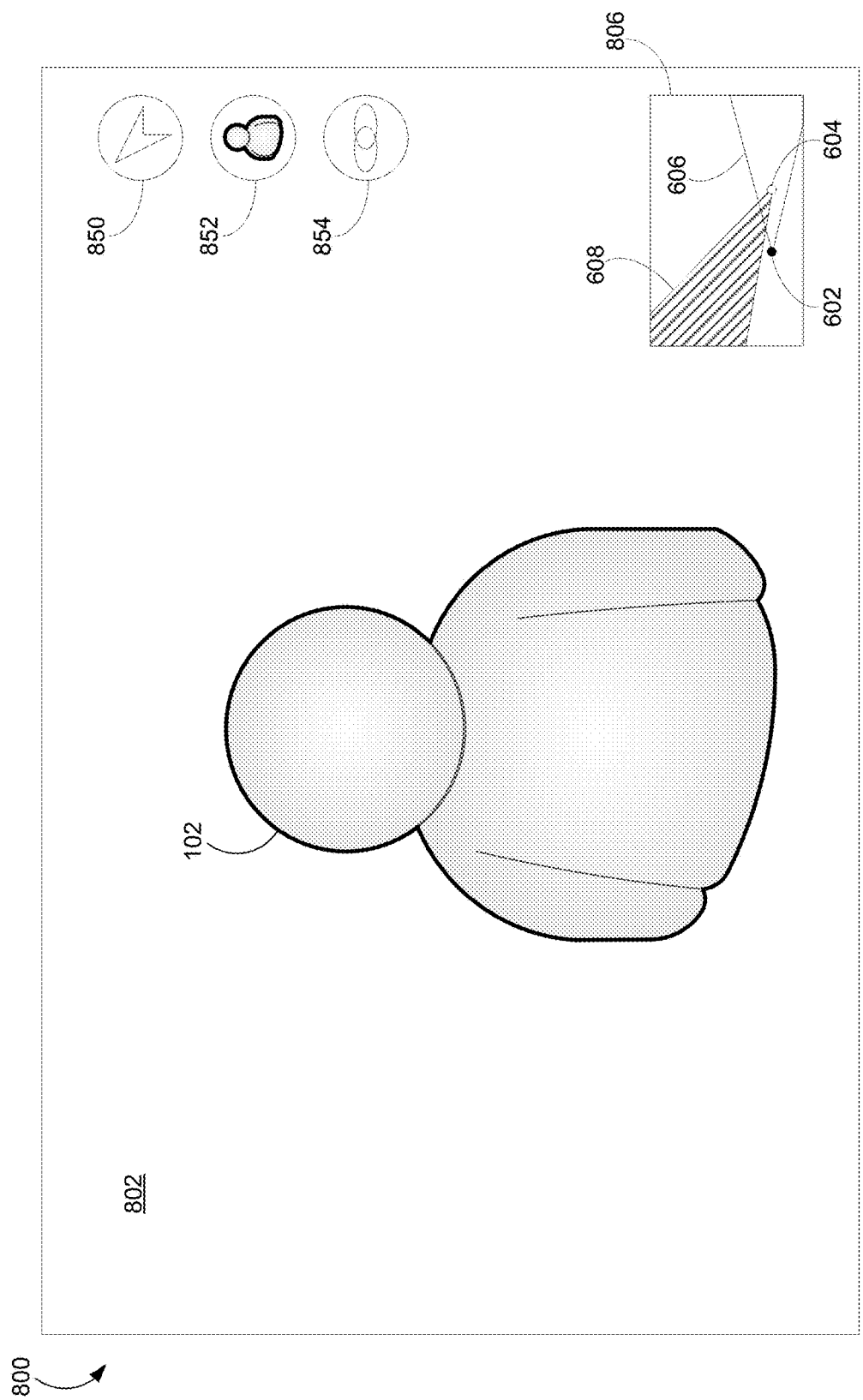

FIGS. 8A-8C illustrate examples of view information and camera device orientation in accordance with some embodiments. View information 800 is displayed at the remote device 114. In some embodiments, view information 800 includes video 802 corresponding to image data from the camera device 108, and a visualization 806 (e.g., visualization 600 or 700) displayed as an inset in the video 802. In FIGS. 8A-8C, visualization 806 is of the same type as visualization 600 described above with reference to FIG. 6. Of course, in some embodiments, visualization 700 or some other suitable visualization similar to visualization 600 or 700 may be displayed in place of visualization 600 in the view information 800. The visualization 806 includes markers 602 and 604, and field of view areas 606 and 608, which are as described above with reference to FIG. 6. In FIG. 8A, the video 802 includes objects 804-A in the local environment 101; the objects 804-A are in the field of view 110 of the camera device 108. The field of view area 606 is pointing in a different direction than the field of view area 608; the objects 804-A are not in the field of view 104 of the local user 102.

In some embodiments, the telepresence module 216 includes a predefined command to automatically reorient the camera device 108 to the same direction as the local user 102, i.e., to orient the field of view 110 of the camera device 108 to the same direction as the field of view 104 of the local user 102. When the user activates this command, the camera device 108 is re-oriented to the same direction as the field of view 104 of the local user 102. FIG. 8B illustrates an example of the view information 800 after the reorientation to the same direction as the field of view 104 of the local user 102. As seen in the visualization 806, the fields of view areas 606 and 608 are oriented in the same direction. Different objects 804-B appear in the video 802; the objects 804-B are in the fields of view 110 and 104 of the camera device 108 and the local user 102.

In some embodiments, the telepresence module 216 includes a predefined command to reorient the camera device 108 to bring the local user 102 into the field of view 110 of the camera device 108. When the user activates this command, the camera device 108 is re-oriented toward the local user 102. FIG. 8C illustrates an example of the view information 800 after the reorientation to bring the local user 102 into the field of view 110 of the camera device 108. As seen in the visualization 806, the marker 604 corresponding to the local user 102 is in the field of view area 606 of the camera device 108. The local user 102 is displayed in the video 802.

In some embodiments, the camera device 108 may be put into a slave mode by the remote user 112 at the remote device 114 using a predefined command. When in slave mode, the camera device 108 automatically orients itself to be directed in the same direction as the local user 102 field of view 608. Thus, as the local user 102 looks around, the camera device 108 automatically follows the field of view of the local user 102, and field of view 606 in the visualization 806 is directed to the same direction as field of view 608.

In some embodiments, when the user selects one of the predefined commands described above at the remote device 114, the camera control module 222 at the remote device 114 receives the user input selecting the command, and sends the command to the server system 120. When the server system 120 receives the predefined command from the remote device 114, the server system 120 determines the movement, rotation, etc. of the camera device 102 required to reorient the camera device 108 in accordance with the command. The server system 120 generates and sends control signals corresponding to the required movement, etc. to the camera device 108, where the control signals are processed and acted upon by the control module 322. In some other embodiments, the camera control module 222 receives the user input selecting the command, determines the camera device 102 movement, etc. needed to fulfill the command, and generates and sends the corresponding control signals to the server system. The server system 120 sends the control signals to the camera device 108, where the control signals are processed and acted upon by the control module 322. In even further embodiments, the camera control module 222 sends the selected command to the server system 120. The server system 120 sends the command to the camera device 108, where the control module 322 processes the command to determine the movements, etc. needed to fulfill the command, and fulfills the command.

In some embodiments, the remote user 112 may manually manipulate the camera (e.g., using input device 118) to orient the camera device 108, including orienting in the same direction as the field of view 104 or to bring the local user 102 into the field of view 110. The remote user 112 may use the view information 800, which is updated as the camera device 108 is reoriented, as guidance as he manually manipulates the camera device 102 into the desired orientation. The sending and receiving of command and control signals, etc. to fulfill the manual manipulation of the camera device 108 are similar to that for predefined commands described above and using the same modules as described above for predefined commands.

In some embodiments, the predefined commands described above are respective menu options selectable at the remote device 114 by the remote user 112. Alternatively, the predefined commands are assigned to respective buttons, key combinations, or other input (physical or virtual) that the user may activate. For example, virtual buttons or icons 850, 852, and 854 are displayed over the view information. Icon 850 corresponds to the command to orient the camera device 108 toward the direction of the field of view 104 of the local user 102. Icon 852 corresponds to the command to orient the camera device 108 to bring the local user 102 into the field of view 110 of the camera device 108. Icon 852 corresponds to the command to put the camera device 108 into slave mode. The user may select any of these icons (e.g., click on the desired icon, perform a tap gesture on the desired icon) to select and activate the corresponding command.

Figure 9A:
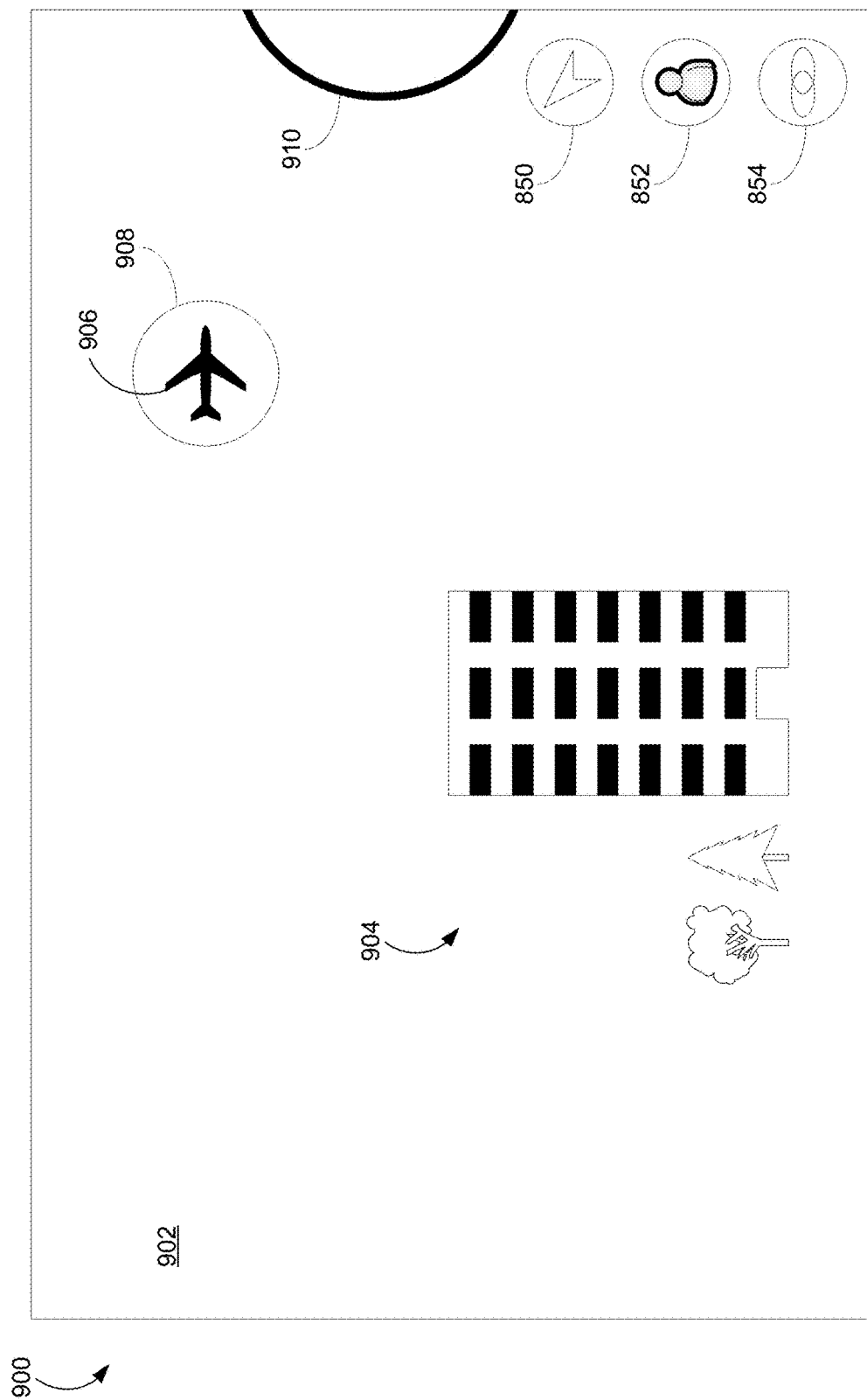
FIGS. 9A-9B illustrate example view information in accordance with some embodiments.
Figure 9B:
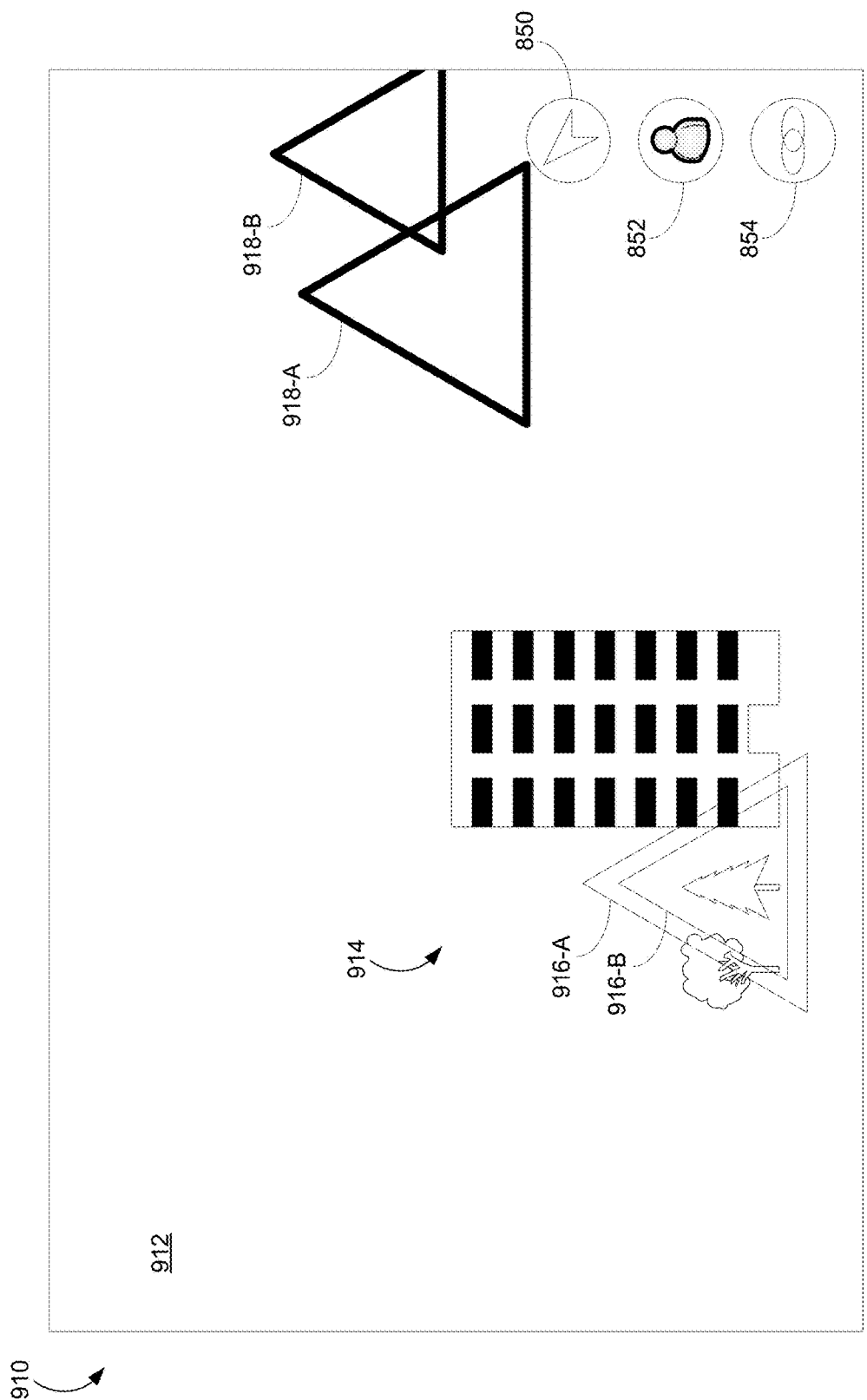

FIGS. 9A-9B illustrate additional examples of view information in accordance with some embodiments. As with view information 800, the remote user 112 may use these view information as guidance as he manipulates the camera device 108 manually or with predefined commands. FIG. 9A illustrates view information 900 displayed at a remote device 114. The view information 900 includes video 902 from the camera device 108. The video 902 shows objects 904 and 906 in the local environment 101. In some embodiments, a user interface for issuing commands to the camera device 108 (e.g., icons 850, 852, and 854) are displayed with the view information 900. The view information 900 also includes a halo 908 that indicates a direction of the field of view 104 of the local user 102 and a halo 901 that indicates where to orient to camera device 108 to bring the local user 102 into the field of view 110 of the camera device 108. Thus, in FIG. 9A, if the remote user 112 wants to see the local user 102, the remote user 112 would manually manipulate (e.g., pan) the camera device 108 toward the right or activate the predefined command described above to automatically bring the local user 102 into view.

FIG. 9B illustrates view information 910 displayed at a remote device 114. The view information 910 includes video 912 from the camera device 108. The video 912 shows objects 914 in the local environment 101. The view information 910 also includes a first set of markers 916-A and 916-B that indicates a direction of the field of view 104 of the local user 102. Markers 916-A and 916-B that are aligned (as in FIG. 9B) indicate that the field of view 110 of the camera device 108 is in the same direction as the field of view 104 of the local user 102; the camera device 108 and the local user 102 are looking at the same objects. When the markers 916-A and 916-B are not aligned, the user would need to reorient the camera device 108 to be oriented toward the same objects as the local user 102. A second set of markers 918-A and 918-B indicate where to look to see the local user 102. Markers 918-A and 918-B that are not aligned (as in FIG. 9B) indicate that the user would need to reorient the camera device 108 to be oriented toward the local user 102. Thus, the view information 910 provides the remote user 112 information on how much to orient the camera device 108 to align with the field of view 104 of the local user 102 or to see the local user 102, as well as a general direction to orient the camera device 108 towards to align with the field of view 104 of the local user 102 or to see the local user 102.

Figure 10A:
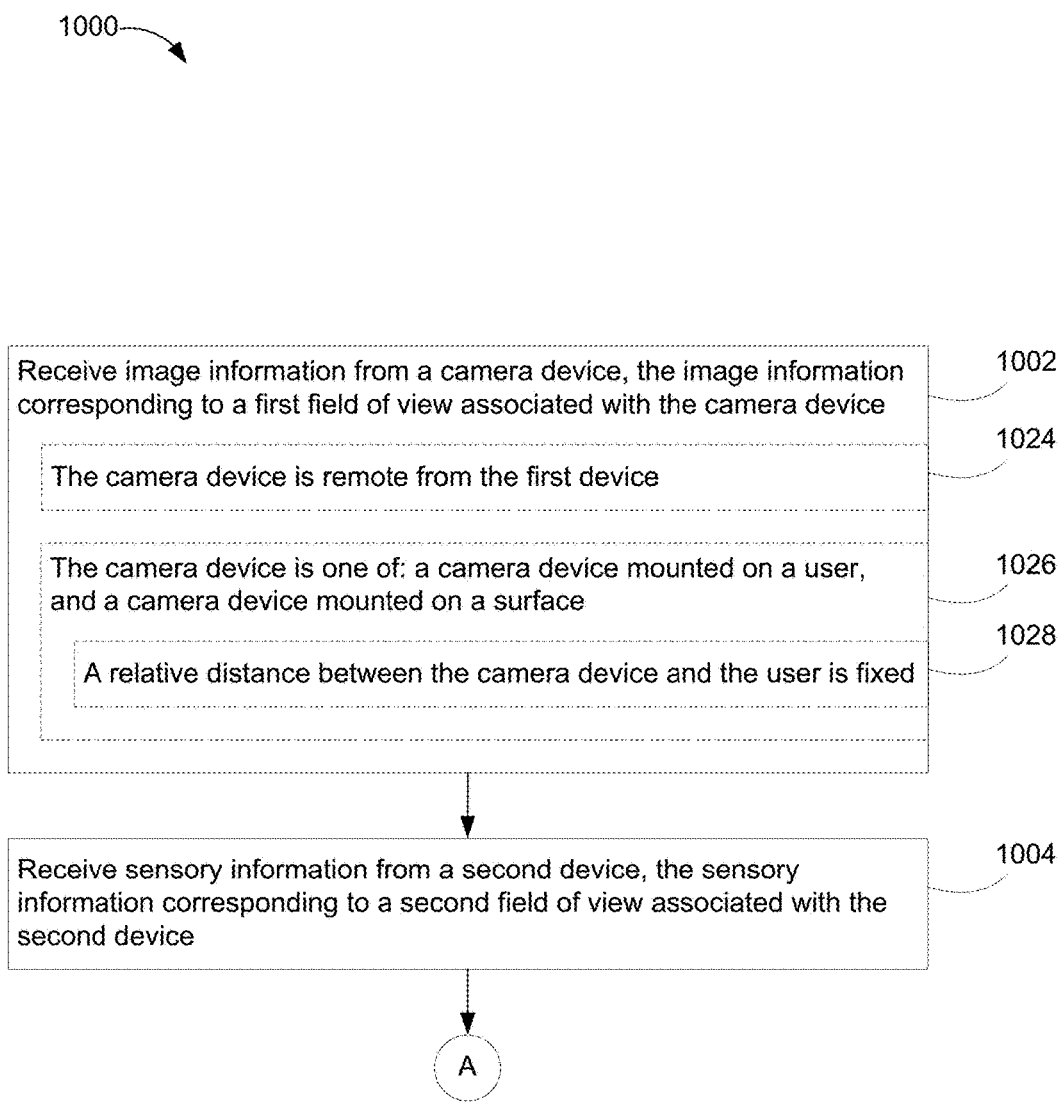
FIGS. 10A-10C illustrate a flow diagram of a method for displaying view information in accordance with some embodiments.
Figure 10B:
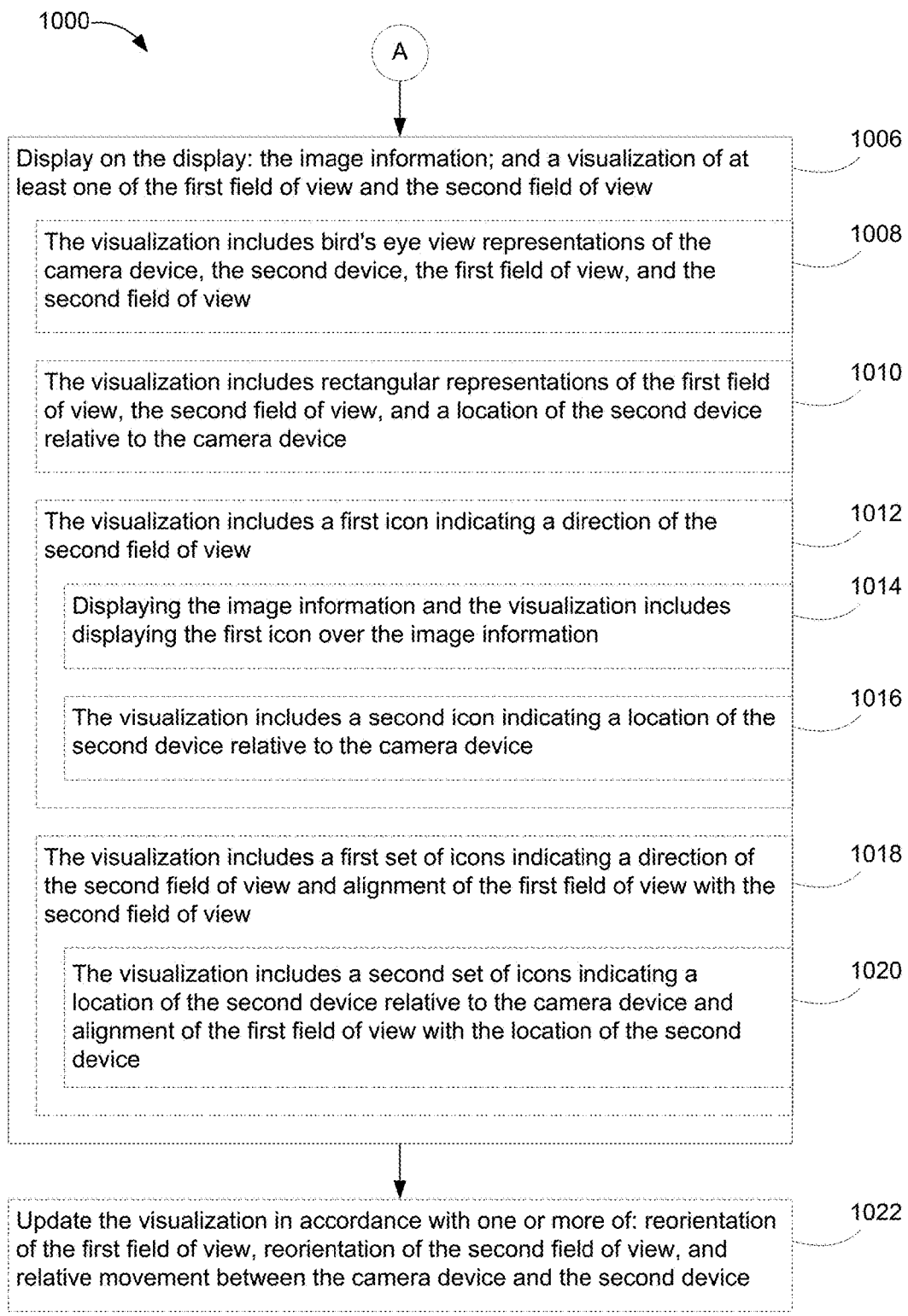
Figure 10C:
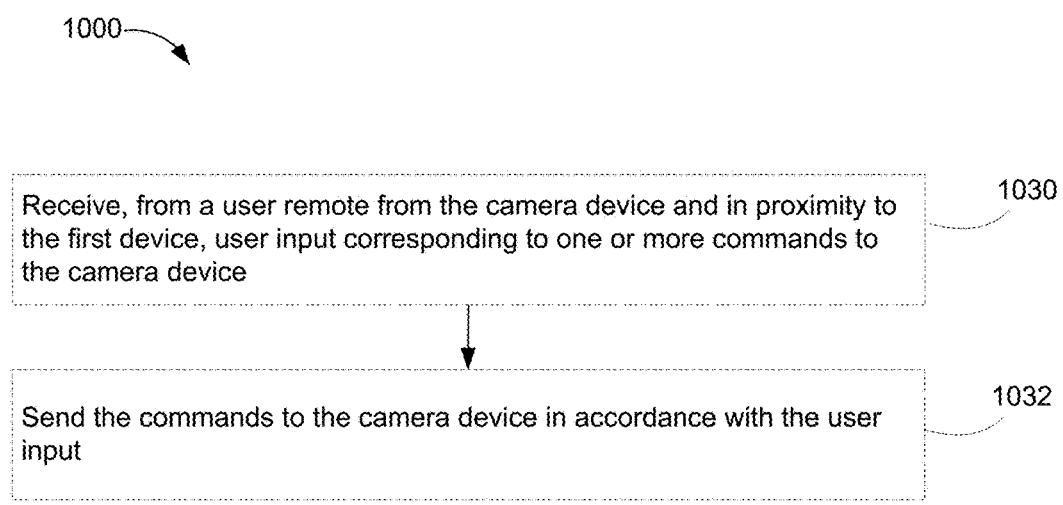

FIGS. 10A-10C illustrate a flow diagram of a method for displaying view information in accordance with some embodiments. In some embodiments, the method is performed at a remote device 114 in a telepresence environment 100.

The device receives (1002) image information from a camera device, the image information corresponding to a first field of view associated with the camera device. The remote device 114 receives image data (e.g., video) from the camera device 108. The image data corresponds to a field of view 110 (e.g., visualized as area 606 in visualization 600 or as area 708 in visualization 700) of the camera device 108.

In some embodiments, the camera device is remote from the first device (1024). For example, in the telepresence environment 100, the camera device 108 is remote from the remote device 114; camera device 108 is in the local environment 101, and the remote device 114 is remote from the local environment 101.

In some embodiments, the camera device is one of: a camera device mounted on a user, and a camera device mounted on a surface (1026). The camera device 108 may be mounted on a local user 102 (e.g., mounted on an arm or boom extending from a harness worn by the local user 102, mounted on headgear worn by the user, carried by the user directly, mounted on an arm or boom carried by the user) or mounted on a surface (e.g., mounted or placed on a table, mounted or placed on top of a video conferencing display).

In some embodiments, a relative distance between the camera device and the user is fixed (1028). When the camera device 108 is mounted on a local user 102, the distance between the local user 102 and the camera device 108 may be fixed. For example, the harness arm or boom on which the camera device 108 is mounted fixes the distance between the camera device 108 and the local user 102.

The device receives (1004) sensory information from a second device, the sensory information corresponding to a second field of view associated with the second device. The remote device 114 receives sensor data from the sensory device 106. The sensory device 106 is calibrated to collect sensor data that can be used to determine a field of view 104 of the local user 102 (e.g., based on sensor readings of head turning, etc.); in some embodiments, the sensory device 106 serves as a proxy for the local user 102.

The device displays (1006) on the display the image information, and a visualization of at least one of the first field of view and the second field of view. For example, the remote device 114 displays view information 800. The view information 800 includes video 802 from the camera device 108, and a visualization 806 of the fields of view 110 and 104 of the camera device 108 and the local user 102, respectively.

In some embodiments, the visualization includes bird's eye view representations of the camera device, the second device, the first field of view, and the second field of view (1008). For example, visualization 600 shows a birds'eye perspective of the relative positions of the camera device 108 (indicated by marker 602) and the local user 102 (indicated by marker 604), the area 608 corresponding to the field of view 104 of the local user 102, and the area 606 corresponding to the field of view 110 of the camera device 108.

In some embodiments, the visualization includes rectangular representations of the first field of view, the second field of view, and a location of the second device relative to the camera device (1010). For example, visualization 700 shows a first person perspective from the perspective of the camera device 108. In the visualization 700, the field of view 110 of the camera device 108, the field of view 104 of the local user 102 and the relative position 710 of the local user 102 are represented by respective rectangular areas (areas 708, 706, 710).

In some embodiments, the visualization includes a first icon indicating a direction of the second field of view (1012). For example, view information 900 includes a halo 908 that indicates a direction of the field of view 104 of the local user 102.

In some embodiments, displaying the image information and the visualization includes displaying the first icon over the image information (1014). For example, in the view information 900, the halo 908 is displayed over the video 902.

In some embodiments, the visualization includes a second icon indicating a location of the second device relative to the camera device (1016). For example, view information 900 includes another halo 910 that indicates a direction toward which the camera device 108 should turn to see the local user 102, thus indicating a relative location of the local user 102.

In some embodiments, the visualization includes a first set of icons indicating a direction of the second field of view and alignment of the first field of view with the second field of view (1018). For example, view information 910 includes markers 916-A and 916-B that indicates a direction of the field of view 104 of the local user 102, and whether the field of view 110 of the camera device 108 is aligned with the field of view 104 of the local user 102.

In some embodiments, the visualization includes a second set of icons indicating a location of the second device relative to the camera device and alignment of the first field of view with the location of the second device (1020). For example, view information 910 includes markers 918-A and 918-B that indicates a direction for the camera device 108 to turn to see the local user 102. The distance between markers 918-A and 918-B from alignment indicates how much the camera device 108 needs to turn to see the local user 102.

In some embodiments, the device updates (1022) the visualization in accordance with one or more of: reorientation of the first field of view, reorientation of the second field of view, and relative movement between the camera device and the second device. As the camera device 108 is reoriented, or the local user 102 changes his field of view (e.g., by turning his head), or the local user 102 moves away from a stationary camera device 108, the video 802 and the visualization 806 are updated to show the current fields of view and relative positions of the camera device 108 and the local user 102.

In some embodiments, the device receives (1030), from a user remote from the camera device and in proximity to the first device, user input corresponding to one or more commands to the camera device; and sends (1032) the commands to the camera device in accordance with the user input. For example, the remote device 114 receives, from the remote user 112, on the input device 118, user input corresponding to predefined commands (e.g., predefined command to automatically point in same direction as the field of view 104 of the local user 102, predefined command to bring the local user 102 into view, predefined command to put the camera device 108 into slave mode) or manual manipulation commands directed to the camera device 108. The commands are sent to the camera device 108 (e.g., thorough the server system 120). In some embodiments, the commands are entered via the displayed image data and visualizations (e.g., a user interface with the image data and the visualizations displayed within and interactive, selectable user interface objects (e.g., icons 850, 852, 852) corresponding to the commands displayed over the image data and the visualizations).

Figure 11:
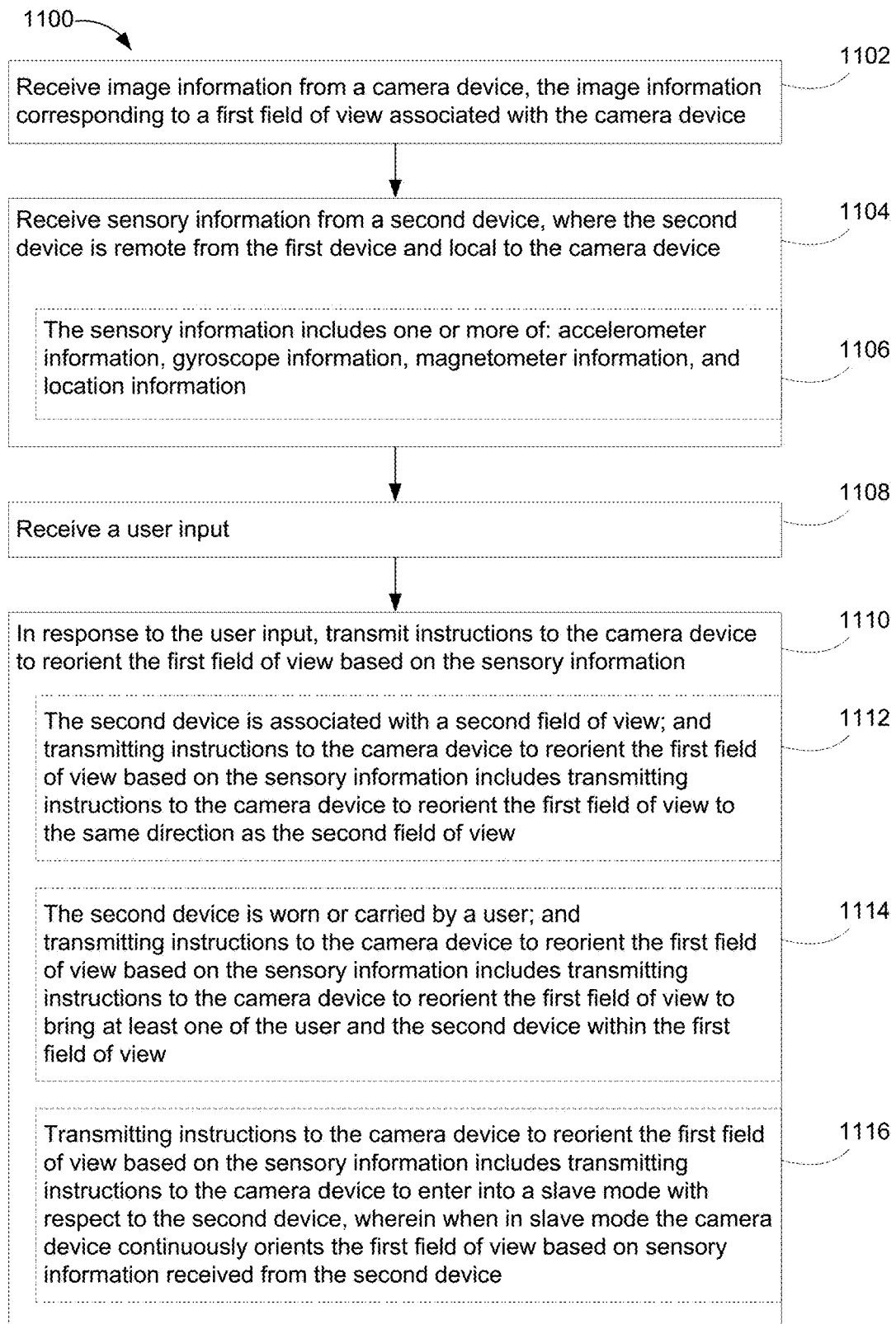
FIG. 11 illustrates a flow diagram of a method for reorienting a camera device in accordance with some embodiments.

FIG. 11 illustrates a flow diagram of a method for reorienting a camera device in accordance with some embodiments. In some embodiments, the method is performed at a remote device 114 in a telepresence environment 100.

The device receives (1102) image information from a camera device, the image information corresponding to a first field of view associated with the camera device. The remote device 114 receives image data (e.g., video) from the camera device 108. The image data corresponds to a field of view 110 (e.g., visualized as area 606 in visualization 600 or as area 708 in visualization 700) of the camera device 108.

The device receives (1104) sensory information from a second device, where the second device is remote from the first device and local to the camera device. The remote device 114 receives sensor data from the sensory device 106. The sensory device 106 is local to the camera device 108 (both are in the local environment 101), but is remote from the remote device 114. The sensory device 106 is calibrated to collect sensor data that can be used to determine a field of view 104 of the local user 102 (e.g., based on sensor readings of head turning, etc.); the sensory device 102 serves as a proxy for the local user 102.

In some embodiments, the sensory information includes one or more of: accelerometer information, gyroscope information, magnetometer information, and location information (1106). The sensor data from the sensory device 106 may include accelerometer information, gyroscope information, and magnetometer information, which are used to determine the field of view of the local user, and location information (e.g., GPS location information), is used to determine the geographical location of the local user. The relative positions of the camera device 108 and the local user 102 may be determined if the geographical location of the camera device 108 is known or determined (e.g., from location information of the camera device 108).

The device 108 receives a user input (1108). The remote device 114 receives a user input from the remote user 112 on an input device 118. The user input selects a predefined command for automatic manipulation of the camera device 108 as described below.

In response to the user input, the device transmits (1110) instructions to the camera device to reorient the first field of view based on the sensory information. In response to the user input, the remote device 114 sends control signals to the camera device 108 to reorient its field of view 110 (e.g., by panning, etc.). The reorientation is done based on the sensory information, or more particularly, based on the field of view 104 and/or the relative position of the local user 102 as determined based on the sensory information.

In some embodiments, the second device is associated with a second field of view, and transmitting instructions to the camera device to reorient the first field of view based on the sensory information includes transmitting instructions to the camera device to reorient the first field of view to the same direction as the second field of view (1112). The local user 102/sensory device 106 has a field of view 104 (e.g., visualized as area 608 or area 706). The remote user 112 commands the camera device 108 to automatically orient itself to the same direction as the field of view 104 of the local user 102. The control signals to the camera device 108 instructs the camera device 108 to perform this orientation to align the directions of the fields of view 110 and 104 of the camera device 108 and the local user 102 (e.g., as in FIG. 8B). In this case, if the local user 102 changes his field of view 104 (e.g., by turning his head), the camera device 108 does not automatically reorient itself absent further instruction from the remote device 114; the automatic reorientation is a one-time operation.

In some embodiments, the second device is worn or carried by a user, and transmitting instructions to the camera device to reorient the first field of view based on the sensory information includes transmitting instructions to the camera device to reorient the first field of view to bring at least one of the user and the second device within the first field of view (1114). The sensory device 106 is worn or carried by the local user 102. The remote user 112 commands the camera device 108 to automatically orient itself to bring the local user 102 into the field of view 110 of the camera device 108. The control signals to the camera device 108 instructs the camera device 108 to perform this orientation to directs its field of view 110 toward the local user 102 (e.g., as in FIG. 8C).

In some embodiments, transmitting instructions to the camera device to reorient the first field of view based on the sensory information includes transmitting instructions to the camera device to enter into a slave mode with respect to the second device, wherein when in slave mode the camera device continuously orients the first field of view based on sensory information received from the second device (1116). The remote user 112 commands the camera device 108 to enter a slave mode. While in slave mode, the camera device 108 continuously automatically orients itself to align the directions of the fields of view 110 and 104 of the camera device 108 and the local user 102 (e.g., as in FIG. 8B).

In some other embodiments (e.g., in embodiments where the camera device 108 is stationary (e.g., on a table)), while in slave mode, the camera device 108 continuously automatically orients itself to keep the local user 102 within the field of view 110 of the camera device 108.

In some embodiments, there are multiple camera devices 108 (for multiple remote users 112) and/or multiple local users 102 and respective sensory devices 106 in the local environment. The telepresence control module 520 coordinates and manages the data exchange for these devices. The fields of view and relative positions of these devices are displayed to the multiple remote users 112 and local users 102.

In some embodiments, the sensory device 106 includes eye tracking capabilities to determine the field of view 104 of the local user 102.

In some embodiments, feedback between the remote user 112 and the local user 102 is displayed at the remote device 114 and/or the sensory device 106. For example, the local user 102 may manipulate a pointer or cursor to direct the attention of the remote user 112 to an object in the local environment 101. Other ways for the remote user 112 and the local user 102 to communicate with each other include voice communication and haptic feedback (e.g., the sensory device 102 has rumbling to guide the local user 102 to turn in some direction).

In some embodiments, the visualization 600 or 700 is superimposed over a geographical map. This gives the remote user 112 and/or the local user 102 an indication of where the camera device 102 and the local user 102 are in geographical terms as well as relative terms.

It will be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Reference will now be made in detail to various embodiments, examples of which are illustrated in the accompanying drawings. In the following detailed description, numerous specific details are set forth in order to provide a thorough understanding of the invention and the described embodiments. However, the invention may be practiced without these specific details. In other instances, well-known methods, procedures, components, and circuits have not been described in detail so as not to unnecessarily obscure aspects of the embodiments.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
   at a first device with a display:
   receiving an image from a camera device remote from the first device, the image corresponding to a first field of view of the camera device;
   receiving sensory information from a second device remote from the first device, the sensory information corresponding to a second field of view of the second device;
   displaying on the display:
      the image; and
      a visualization, distinct from the image, of an angle orientation of the first field of view and an angle orientation of the second field of view, wherein the visualization includes a first bounded area representing the angle orientation of the first field of view and a second bounded area representing the angle orientation of the second field of view;
   sending a command to orient the angle orientation of the first field of view of the camera device with the angle orientation of the second field of view corresponding to the sensory information; and
   upon sending the command, updating the visualization in accordance with the orienting of the angle orientation, to show the first field of view of the camera device overlapping with the angle orientation of the second field of view corresponding to the sensory information.

2. The method of claim 1, wherein the visualization includes bird's eye view representations of the camera device, the second device, the first field of view, and the second field of view.

3. The method of claim 1, wherein the visualization includes a location of the second device relative to the camera device.

4. The method of claim 1, wherein the visualization includes a first icon indicating a direction of the second field of view.

5. The method of claim 4, wherein displaying the image information and the visualization includes displaying the first icon over the image information.

6. The method of claim 4, wherein the visualization includes a second icon indicating a location of the second device relative to the camera device.

7. The method of claim 1, wherein the visualization includes a first set of icons indicating a direction of the second field of view and alignment of the first field of view with the second field of view.

8. The method of claim 7, wherein the visualization includes a second set of icons indicating a location of the second device relative to the camera device and alignment of the first field of view with the location of the second device.

9. The method of claim 1, wherein the camera device is remote from the first device.

10. The method of claim 1, wherein the camera device is one of: a camera device mounted on a user, and a camera device mounted on a surface.

11. The method of claim 10, wherein a relative distance between the camera device and the user is fixed.

12. The method of claim 1, wherein:
   sending the command includes transmitting instructions to the camera device to reorient the first field of view to the same direction as the second field of view.

13. The method of claim 1, wherein:
the second device is worn or carried by a user; and
sending a second command includes transmitting instructions to the camera device to reorient the first field of view to bring at least one of the user and the second device within the first field of view.

14. The method of claim 1, wherein:
sending the command includes transmitting instructions to the camera device to enter into a slave mode with respect to the second device, wherein when in slave mode the camera device continuously orients the first field of view based on sensory information received from the second device.

15. The method of claim 1, wherein:
the sensory information includes one or more of: accelerometer information, gyroscope information, magnetometer information, and location information.

16. The method of claim 1, further comprising: displaying on the display a visualization of angles of the first field of view and the second field of view.

17. A first device, comprising:
a display;
memory;
one or more processors; and
one or more programs stored in the memory and configured for execution by the one or more processors, the one or more programs including instructions for:
receiving an image from a camera device remote from the first device, the image corresponding to a first field of view of the camera device;
receiving sensory information from a second device remote from the first device, the sensory information corresponding to a second field of view of the second device;
displaying on the display:
the image; and
a visualization, distinct from the image, of an angle orientation of the first field of view and an angle orientation of the second field of view, wherein the visualization includes a first bounded area representing the angle orientation of the first field of view and a second bounded area representing the angle orientation of the second field of view; and
sending a command to orient the angle orientation of the first field of view of the camera device with the angle orientation of the second field of view corresponding to the sensory information; and
upon sending the command, updating the visualization in accordance with the orienting of the angle orientation, to show the first field of view of the camera device overlapping with the angle orientation of the second field of view corresponding to the sensory information.

18. A non-transitory computer readable storage medium storing one or more programs to be executed by a computer system with a display, memory, and one or more processors, the one or more programs comprising instructions for:
receiving an image from a camera device remote from the first device, the image corresponding to a first field of view of the camera device;
receiving sensory information from a second device remote from the first device, the sensory information corresponding to a second field of view of the second device;
displaying on the display:
the image; and
a visualization, distinct from the image, of an angle orientation of the first field of view and an angle orientation of the second field of view, wherein the visualization includes a first bounded area representing the angle orientation of the first field of view and a second bounded area representing the angle orientation of the second field of view; and
sending a command to orient the angle orientation of the first field of view of the camera device with the angle orientation of the second field of view corresponding to the sensory information; and
upon sending the command, updating the visualization in accordance with the orienting of the angle orientation, to show the first field of view of the camera device overlapping with the angle orientation of the second field of view corresponding to the sensory information.

* * * * *

UNITED STATES PATENT AND TRADEMARK OFFICE
CERTIFICATE OF CORRECTION

PATENT NO. : 10,250,813 B2
APPLICATION NO. : 14/476605
DATED : April 2, 2019
INVENTOR(S) : Kimber et al.

Page 1 of 1

It is certified that error appears in the above-identified patent and that said Letters Patent is hereby corrected as shown below:

In the Claims

Claim 17, Column 22, Line 7, please delete "visualization in" and insert --visualization, in--;

Claim 18, Column 22, Line 36, please delete "visualization in" and insert --visualization, in--.

Signed and Sealed this
Second Day of July, 2019

Andrei Iancu
*Director of the United States Patent and Trademark Office*